(12) United States Patent
Jager et al.

(10) Patent No.: US 11,090,736 B2
(45) Date of Patent: Aug. 17, 2021

(54) SIDE-ACTIVATED MODULAR DRILL

(71) Applicant: KENNAMETAL, INC., Latrobe, PA (US)

(72) Inventors: Horst Manfred Jager, Nuremberg (DE); Ruy Frota De Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/214,717

(22) Filed: Dec. 10, 2018

(65) Prior Publication Data

US 2020/0180047 A1 Jun. 11, 2020

(51) Int. Cl.
*B23B 51/02* (2006.01)
*B23B 31/107* (2006.01)

(52) U.S. Cl.
CPC .......... *B23B 51/02* (2013.01); *B23B 31/1075* (2013.01); *B23B 2251/02* (2013.01); *B23B 2251/50* (2013.01); *Y10T 408/90993* (2015.01)

(58) Field of Classification Search
CPC . B23B 2251/50; B23B 2251/02; B23B 51/02; B23B 31/06; B23B 31/07; B23B 31/1075; Y10T 408/90993
See application file for complete search history.

(56) References Cited

U.S. PATENT DOCUMENTS

| | | | |
|---|---|---|---|
| 124,089 A | 2/1872 | Shepardson | |
| 318,994 A | 6/1885 | Lake | |
| 1,451,548 A | 7/1923 | West | |
| 1,461,023 A | 7/1923 | Becker | |
| 1,946,158 A | 2/1934 | Gorg | |
| 2,167,014 A | 7/1939 | Verderber | |
| 2,399,939 A | 5/1946 | Phillips | |
| 2,400,856 A | 5/1946 | Thompson | |
| 2,485,799 A * | 10/1949 | Woytych | B23B 31/06 279/76 |
| 2,801,614 A | 8/1957 | Dieterich | |

(Continued)

FOREIGN PATENT DOCUMENTS

| | | |
|---|---|---|
| CN | 103692001 A | 4/2014 |
| CN | 205020901 U | 2/2016 |

(Continued)

OTHER PUBLICATIONS

Feb. 6, 2018 Office action (3 months).

(Continued)

*Primary Examiner* — Chwen-Wei Su
(74) *Attorney, Agent, or Firm* — Larry R. Meenan

(57) ABSTRACT

A cutting insert includes a head portion having a number of cutting edges and a centering pin which is disposed about a central longitudinal axis and which is coupled to, and extends axially away from, the main head portion. The centering pin includes a recess structured to accommodate a portion of a setscrew. The recess includes: a first angled surface disposed generally facing away from a leading end of the centering pin at an acute first angle with respect to the longitudinal axis of the centering pin; and a second angled surface which is positioned opposing the first angled surface at an acute second angle with respect to the longitudinal axis of the centering pin.

10 Claims, 26 Drawing Sheets

(56) References Cited

U.S. PATENT DOCUMENTS

| | | | |
|---|---|---|---|
| 2,847,225 | A | 8/1958 | Kosinski |
| 3,049,033 | A | 8/1962 | Benjamin et al. |
| 3,311,023 | A | 3/1967 | Kaiser |
| 3,436,990 | A | 4/1969 | Tourison |
| 4,611,672 | A | 9/1986 | Holzl |
| 4,632,593 | A | 12/1986 | Stashko |
| 4,726,268 | A | 2/1988 | Erickson |
| 4,744,704 | A | 5/1988 | Galvefors |
| 4,813,829 | A | 3/1989 | Koppelmann |
| 4,854,789 | A | 8/1989 | Evseanko, Jr. |
| 4,913,607 | A * | 4/1990 | von Haas ............... B23B 31/06 279/155 |
| 5,452,971 | A | 9/1995 | Nevills |
| 5,599,145 | A | 2/1997 | Reinauer et al. |
| 5,622,460 | A | 4/1997 | Satran et al. |
| 5,678,645 | A | 10/1997 | Tibbitts et al. |
| 5,704,742 | A | 1/1998 | Reinauer |
| 5,820,318 | A | 10/1998 | Danielsson et al. |
| 5,904,448 | A | 5/1999 | Lee et al. |
| 5,904,455 | A | 5/1999 | Krenzer |
| 5,957,631 | A | 9/1999 | Hecht |
| 5,957,635 | A | 9/1999 | Nuzzi et al. |
| 5,961,259 | A | 10/1999 | Ziegler |
| 6,012,881 | A | 1/2000 | Scheer |
| 6,109,152 | A | 8/2000 | Hecht |
| 6,109,841 | A | 8/2000 | Johne |
| 6,196,769 | B1 | 3/2001 | Satran et al. |
| 6,447,222 | B2 | 9/2002 | Kojima |
| 6,485,235 | B1 | 11/2002 | Mast et al. |
| 6,506,003 | B1 | 1/2003 | Erickson |
| 6,514,019 | B1 | 2/2003 | Schulz |
| 6,530,728 | B2 | 3/2003 | Eriksson |
| 6,582,164 | B1 | 6/2003 | McCormick |
| 6,783,307 | B2 | 8/2004 | Lindblom |
| 6,783,308 | B2 | 8/2004 | Lindblom |
| 7,131,799 | B2 | 11/2006 | Stokey et al. |
| 7,309,196 | B2 | 12/2007 | Frota de Souza |
| 7,407,350 | B2 | 8/2008 | Hecht |
| 7,467,915 | B2 | 12/2008 | de Souza, Filho |
| 7,478,983 | B2 * | 1/2009 | Guy .................... B23B 31/006 279/43.2 |
| 7,625,161 | B1 | 12/2009 | Frota de Souza |
| 7,997,836 | B2 | 8/2011 | Kim et al. |
| 8,312,615 | B2 * | 11/2012 | Frota de Souza Filho ................. B23B 29/046 29/525.01 |
| 8,550,756 | B2 | 10/2013 | Borschert et al. |
| 8,678,722 | B2 | 3/2014 | Aare |
| 8,702,356 | B2 | 4/2014 | Hecht et al. |
| 8,721,235 | B2 | 5/2014 | Kretzschmann et al. |
| 8,876,444 | B1 | 11/2014 | Chanturidze |
| 8,876,446 | B2 | 11/2014 | Shaheen |
| 8,882,413 | B2 | 11/2014 | Hecht |
| 8,992,143 | B2 | 3/2015 | Glimpel et al. |
| 9,108,251 | B2 | 8/2015 | Craig |
| 9,162,295 | B2 | 10/2015 | Pabel et al. |
| 9,205,498 | B2 | 12/2015 | Jaeger |
| 9,468,979 | B2 | 10/2016 | Hecht |
| 9,545,699 | B2 * | 1/2017 | Furusawa ............... B24B 23/04 |
| 9,555,484 | B2 | 1/2017 | Koga |
| 9,770,766 | B2 | 9/2017 | Singer-Schnoeller |
| 9,895,754 | B2 | 2/2018 | Mani |
| 10,471,522 | B2 | 11/2019 | Yamamoto et al. |
| 2001/0026738 | A1 | 10/2001 | Kojima |
| 2002/0015623 | A1 | 2/2002 | Eriksson |
| 2002/0168239 | A1 | 11/2002 | Mast et al. |
| 2003/0091402 | A1 | 5/2003 | Lindblom |
| 2003/0091403 | A1 | 5/2003 | Lindblom |
| 2003/0219321 | A1 | 11/2003 | Borschert et al. |
| 2005/0098359 | A1 | 5/2005 | Lee |
| 2006/0051172 | A1 | 3/2006 | Johnson et al. |
| 2007/0274794 | A1 | 11/2007 | Cirino |
| 2008/0003072 | A1 | 1/2008 | Kim et al. |
| 2010/0021253 | A1 | 1/2010 | Frejd |
| 2010/0104384 | A1 | 4/2010 | Orlov et al. |
| 2010/0303561 | A1 | 12/2010 | Fouquer |
| 2010/0322731 | A1 | 12/2010 | Aare |
| 2011/0008114 | A1 * | 1/2011 | Wang ................. B23B 31/1075 407/44 |
| 2011/0110739 | A1 | 5/2011 | Frisendahl |
| 2011/0114393 | A1 | 5/2011 | Dolan et al. |
| 2011/0236145 | A1 | 9/2011 | Pabel et al. |
| 2012/0014760 | A1 | 1/2012 | Glimpel et al. |
| 2012/0014860 | A1 | 1/2012 | Harris et al. |
| 2012/0148358 | A1 | 6/2012 | Hecht et al. |
| 2012/0230787 | A1 | 9/2012 | Harif |
| 2013/0042462 | A1 | 2/2013 | Frota de Souza Filho |
| 2014/0154023 | A1 | 6/2014 | Craig |
| 2014/0255117 | A1 | 9/2014 | Tseng |
| 2014/0353931 | A1 | 12/2014 | Frota de Souza Filho et al. |
| 2014/0360334 | A1 | 12/2014 | Singer-Schnoeller |
| 2014/0363257 | A1 | 12/2014 | Parker |
| 2015/0306686 | A1 | 10/2015 | Mani |
| 2015/0360300 | A1 | 12/2015 | Hecht |
| 2016/0067785 | A1 | 3/2016 | Wang et al. |
| 2016/0263664 | A1 | 9/2016 | Son |
| 2018/0065191 | A1 | 3/2018 | Hecht |

FOREIGN PATENT DOCUMENTS

| | | |
|---|---|---|
| DE | 7043832 U | 3/1971 |
| DE | 19710996 C2 | 12/1999 |
| DE | 202011050277 U1 | 7/2012 |
| EP | 0343653 A1 | 11/1989 |
| EP | 1864733 A1 | 12/2007 |
| GB | 3B1341651 | 12/1973 |
| JP | 200084718 A | 3/2000 |
| JP | 2004261931 A | 9/2004 |
| JP | 2004306170 A | 11/2004 |
| JP | 2004330390 A | 11/2004 |
| JP | 2004330391 A | 11/2004 |
| JP | 2006272472 A | 10/2006 |
| JP | 2016-193461 | 11/2016 |
| SE | 516366 C2 | 4/2001 |
| WO | 96/034714 A1 | 11/1996 |
| WO | WO2006001551 A1 | 1/2006 |
| WO | WO2009050789 A1 | 4/2009 |
| WO | WO2011058532 A2 | 5/2011 |
| WO | WO2013033740 A1 | 3/2013 |
| WO | 17207793 A1 | 12/2017 |
| WO | WO2017207793 A1 | 12/2017 |

OTHER PUBLICATIONS

Feb. 14, 2091 Non-Final OA.
Aug. 31, 2018 Final OA.
Jun. 11, 2018 Non-Final OA.
Nov. 15, 2019 Exam Notice.
Aug. 8, 2019 Final OA.
Nov. 23, 2018 Advisory Action Received.
Jun. 27, 2019 International Search Report Transmitted.
Feb. 3, 2020 Exam Notice.
English translation of first Office action for Chinese Patent Application No. 201780076453.4 dated Jun. 3, 2020.
English translation of first Office action for Chinese Patent Application No. 201810251132X dated Jul. 29, 2020.
Jan. 15, 2021 Office Action (non-US) CN App. No. 110062676A.

* cited by examiner

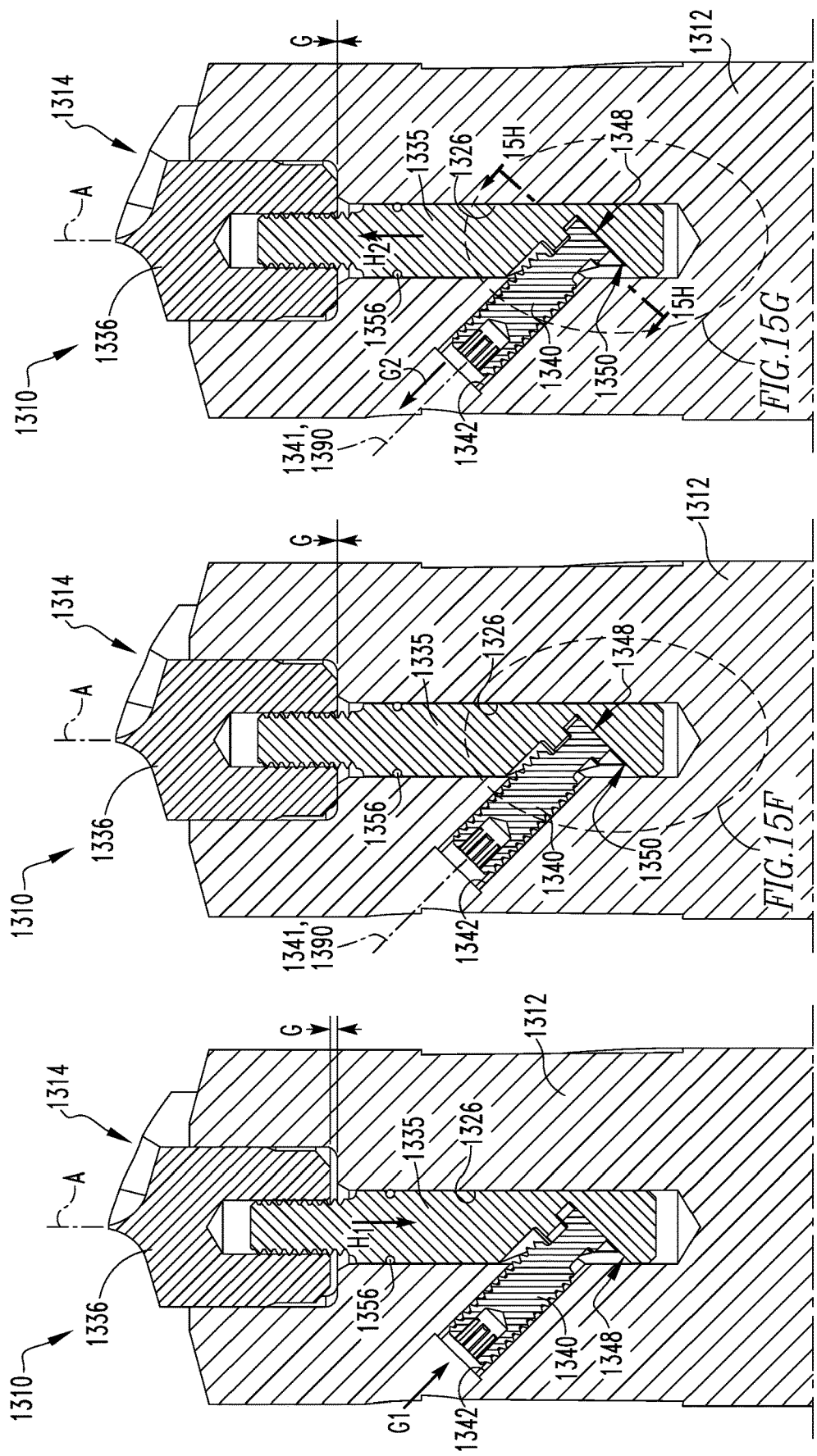

SIDE-ACTIVATED MODULAR DRILL

BACKGROUND

A great variety of drills with replaceable cutting tips (or cutting inserts) are known conventionally. Illustrative examples may be appreciated via U.S. Pat. Nos. 7,309,196 and 7,467,915 to Frota de Souza, Filho, and U.S. Pat. No. 9,205,498 to Jaeger. Such drills involve replaceable cutting heads which are mounted on shanks. Typically, though by no means exclusively, the cutting heads and shanks can display continuous and complementing configuration as fluted drills. Each shank will normally include a structure for retaining and rotating an associated cutting head, while the associated cutting head will have a complementing structure for being retained and rotated by the shank.

Often, challenges are encountered conventionally with respect to deformation and failure during the service life of a drill, due (at least in part) to a concentration of stresses imposed on the retaining and drive structure of the shank during ordinary service. This may unduly limit the useful service life of the drill, thus relevant improvements and modifications continue to be sought that might help mitigate the effect of known problems and constraints.

SUMMARY

In summary, one aspect of the invention provides a rotary cutting tool comprising: a shank; and an interchangeable cutting tip; the shank comprising a pocket which receives the interchangeable cutting tip via an interference fit; the pocket comprising two centering wall portions which, when viewed along a central longitudinal axis of the shank, are oriented at a first angle with respect to one another, the first angle being greater than zero; the interchangeable cutting tip being axially displaceable between: an initial position, which is assumed by the interchangeable cutting tip upon being received in the pocket of the shank; a clamped position, wherein the interchangeable cutting tip is fixedly held with respect to the shank; and a bump-off position, wherein the interchangeable cutting tip is not fixedly held with respect to the shank; a holding element which holds the interchangeable cutting tip in the clamped position; and a bump-off element which displaces the interchangeable cutting tip between the clamped position and the bump-off position.

Another aspect of the invention provides a shank for a rotary cutting tool, the shank comprising: a pocket which receives an interchangeable cutting tip via an interference fit; the pocket comprising two centering wall portions which, when viewed along a central longitudinal axis of the shank, are oriented at a non-zero angle with respect to one another; a holding element which holds an interchangeable cutting tip in the clamped position; a bump-off element which displaces an interchangeable cutting tip between the clamped position and the bump-off position; and a pair of torque transmission walls for rotationally driving an interchangeable cutting insert about the central longitudinal axis of the shank; the torque transmission walls each being oriented at a predetermined angle with respect to a defining dimension of at least one of the centering wall portions, the third angle being between about 75 degrees and about 120 degrees.

Yet another aspect of the invention provides a cutting insert comprising: a head portion having a number of cutting edges; and a centering pin which is disposed about a central longitudinal axis and which is coupled to, and extends axially away from, the main head portion, the centering pin comprising a recess structured to accommodate a portion of a setscrew, the recess comprising: a first angled surface disposed generally facing away from a leading end of the centering pin at an acute first angle with respect to the longitudinal axis of the centering pin; and a second angled surface which is positioned opposing the first angled surface at an acute second angle with respect to the longitudinal axis of the centering pin.

A further aspect of the invention provides a centering pin for use in a cutting insert, the centering pin comprising: an elongated body disposed about a central longitudinal axis; and a recess structured to accommodate a portion of a setscrew, the recess comprising: a first angled surface disposed generally facing away from a leading end of the elongated body at an acute first angle with respect to the longitudinal axis; and a second angled surface which is positioned opposing the first angled surface at an acute second angle with respect to the longitudinal axis.

Yet a further aspect of the invention provides a rotary cutting tool comprising: a shank having a pocket; an interchangeable cutting insert comprising: a head portion positionable in the pocket, the head portion having a number of cutting edges; and a centering pin which is disposed about a central longitudinal axis and which is coupled to, and extends axially away from, the main head portion, the centering pin comprising a recess comprising: a first angled surface disposed generally facing away from a leading end of the centering pin at an acute first angle with respect to the longitudinal axis of the centering pin; and a second angled surface which is positioned opposing the first angled surface at an acute second angle with respect to the longitudinal axis of the centering pin; and a setscrew having: a threaded main shaft portion disposed about a central longitudinal axis, the threaded main shaft portion threadingly engaged with a correspondingly threaded channel formed in the shank in a manner such that the can reciprocally translate within the channel; a narrowed neck region disposed adjacent the main shaft portion; and a head portion disposed adjacent the narrowed neck region opposite the main shaft portion, the head portion defined in-part by a clamping surface disposed at a distal end of the setscrew opposite the neck region and a bump surface disposed adjacent the neck region opposite the clamping surface; wherein the setscrew and the cutting insert are movable among: an initial position, wherein the cutting tip is initially received in the pocket and the setscrew is not directly engaged with the centering pin; a clamped position, wherein the cutting tip is fixedly held with respect to the shank via engagement between the clamping surface of the setscrew and the first angled surface of the recess of the centering pin; and a bump-off position, wherein the cutting tip is forced outward from the shank via engagement between the bump surface of the setscrew and the second angled surface of the recess of the centering pin.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE DRAWINGS

FIG. 15C schematically illustrates the cutting insert and setscrew of FIG. 15A in another positioning in which the engagement between the setscrew and the cutting insert has forced the cutting insert further into the shank.

FIG. 15D schematically illustrates the cutting insert and setscrew of FIG. 15A, but in a "clamped" position in the shank.

FIG. 15E schematically illustrates the cutting insert and setscrew of FIG. 15A, but in a position set for "bump-off" or disassembly of the cutting insert from the shank.

DETAILED DESCRIPTION

Figure 1:
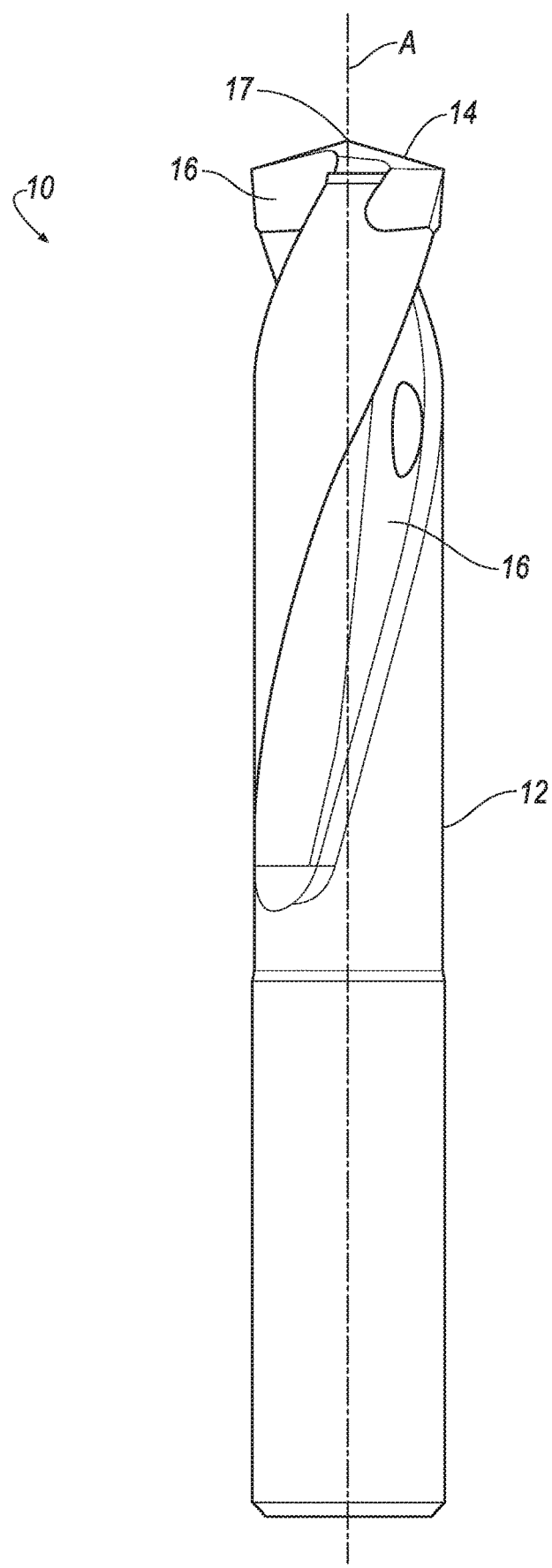
FIG. 1 provides an elevational view of a rotary cutting tool which includes a shank and an interchangeable cutting insert.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

As used herein, the term "about", when used in conjunction with numerical values, is intended to cover such numerical value as well as values within reasonable tolerances of such value as would be recognized by one of ordinary skill in the art.

The description now turns to the figures. The illustrated embodiments of the invention will be best understood by reference to the figures. The following description is intended only by way of example and simply illustrates certain selected exemplary embodiments of the invention as claimed herein. To facilitate easier reference, in advancing from FIG. 1 to and through FIG. 15H, a reference numeral is advanced by a multiple of 100 in indicating a substantially similar or analogous component or element with respect to at least one component or element found in one or more earlier figures among FIGS. 1-15H.

FIG. 1 shows a rotary cutting tool 10 in the form of a drill, having a shank 12 and a cutting insert 14, which are both produced as separate parts. The cutting insert 14 can be fastened to, or installed on, the shank 12 in a detachable and interchangeable manner. Similarly, the rotary cutting tool, for performing rotary cutting operations on a workpiece, can also be designed as a countersinking, milling or reaming tool. For purely illustrative purposes, the cutting tool 10 shown in FIG. 1 is a twist drill which includes a pair of helical flutes 16 disposed along the sides of the drill, in diametric opposition to one another. Each flute 16 extends over the shank 12 and the cutting insert 14, wherein the latter also includes a drill point 17.

Generally, a central longitudinal axis A is defined through the cutting tool 10 (common to both the shank 12 and the cutting insert 14), about which the cutting tool 10 rotates during operation. A "cutting insert" may alternatively be referred to, herein and elsewhere, with any of a variety of other suitable terms such as "tip", "insert", "head", "cutting tip" or "cutting head".

It should be noted that each flute 16, as shown in FIG. 1, includes portions that are disposed in both the shank 12 and the cutting insert 16 alike. Thus, once cutting insert 14 is installed on shank 12, corresponding flute portions in the cutting insert 14 and shank 12, alike, will align to form flutes 16 that are generally continuous and undistorted. Although two flutes 16 are depicted herein, it should be understood that any number of flutes (including only one) is possible.

Figure 2:
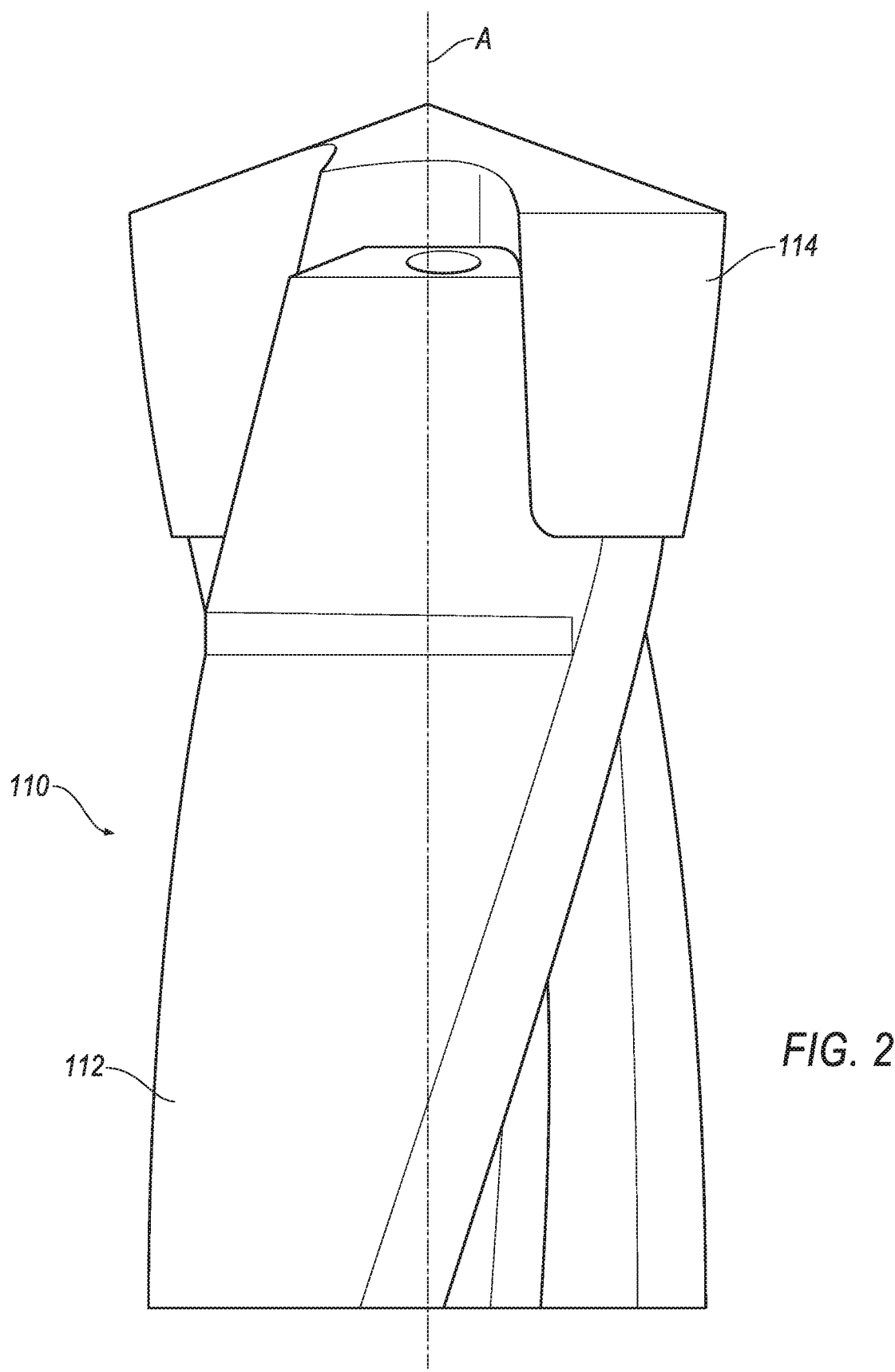
FIG. 2 provides an elevational view of a shank and cutting insert in a cutting tool 110.

FIG. 2 provides an elevational view of a shank 112 and cutting insert 114 in a cutting tool 110, in accordance with at least one embodiment. As shown, the cutting insert 114 is fixedly positioned at an axial end of the shank 112, in preparation for operation. Further details of a shank and cutting insert in accordance with at least one embodiment will be better appreciated from the ensuing discussion.

In the depiction of FIG. 2, cutting head 114 emerges at a leading end of cutting tool 110. A "leading end", defined herein for semantic purposes, represents that end which engages a work piece when cutting. During cutting operations, cutting tool 110 is rotated, and advanced progressively into a workpiece as cutting progresses. That end of cutting tool located oppositely to the leading end can be referred to as the "trailing end". The terms "leading end" and "trailing end" are semantic devices which apply equally to shank 12 and cutting head 14 as they connote directional orientation with respect to longitudinal axis A rather than specific structure.

Figure 3:
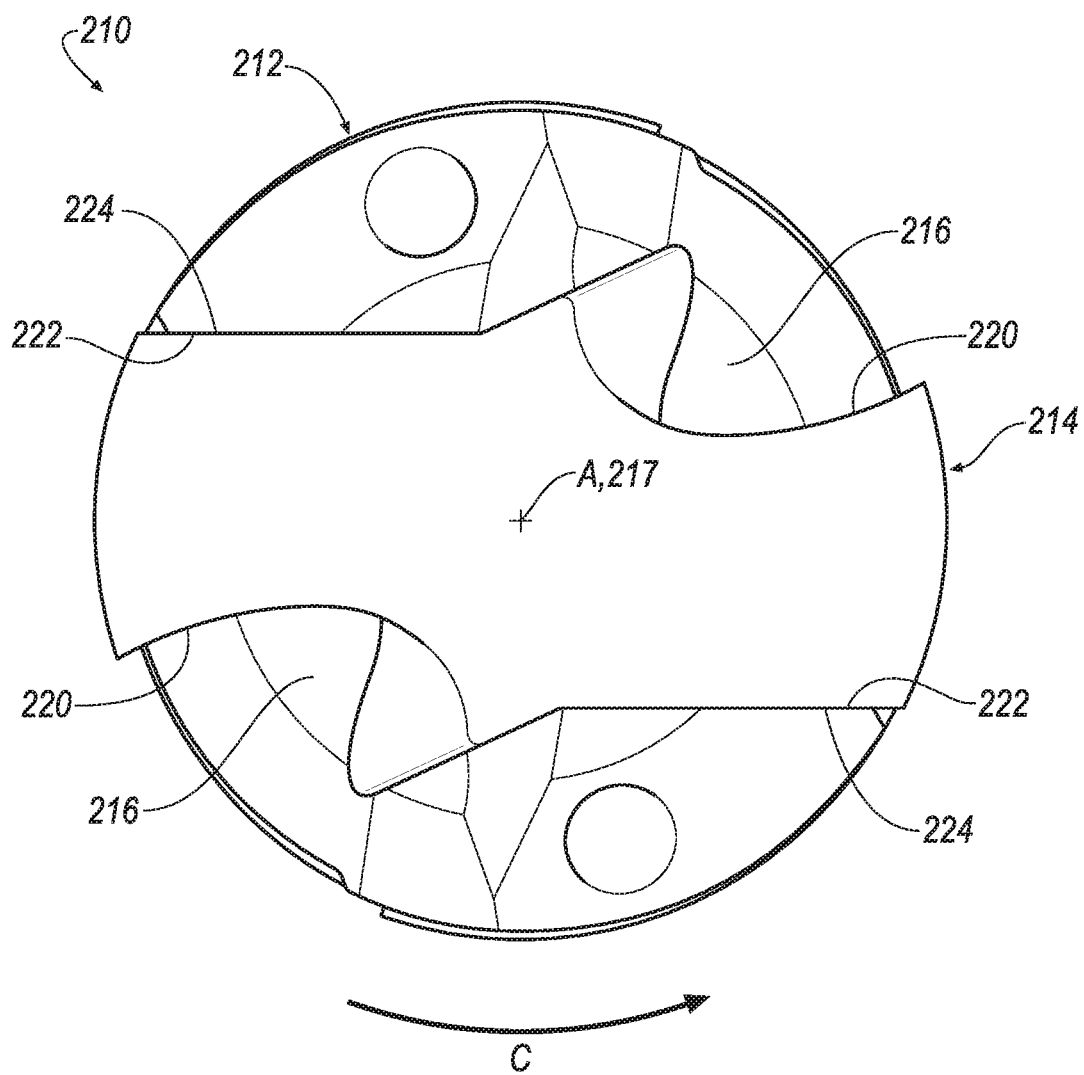
FIG. 3 provides a plan view of a conventional cutting tool with a shank, and a cutting insert installed therein.

By way of general comparison in accordance with at least one embodiment, FIG. 3 provides a plan view of a conventional cutting tool 210 with a shank, and a cutting insert installed therein. As shown, the insert 214 is mounted at an axial end of the shank 212, for engaging in a cutting operation when the cutting tool 210 is rotated about longitudinal axis A in a counter-clockwise cutting direction C (when viewed with respect to FIG. 3). The tool 210 includes a pair of flutes 216 defined via mutual positioning of the shank 212 and insert 214 with respect to one another. The insert 214 is received in a pocket of the shank 212 via an interference fit.

Cutting insert 214 includes a pair of cutting edges 220, each disposed adjacent to a respective flute 216. As can be appreciated, the cutting edges 220 will cut into a workpiece as the drill 210 is rotated in cutting direction C when engaging a workpiece. For the purpose of rotatably driving the cutting insert 214, the same includes two drive surfaces 222 that are dimensioned and disposed in a manner to be engaged by compatible torque transmission walls 224 of the shank 212. The drive surfaces 222 and torque transmission walls 224, alike, are usually each oriented along a plane that is essentially parallel with respect to longitudinal axis A. Though not explicitly illustrated here, rotation of the entire cutting tool 210 can be actuated via a separate driving element, such as a hand drill, drill press or machine tool, which causes the shank 212 to rotate.

As such, with the conventional arrangement illustrated in FIG. 3, the walls 224 and drive surfaces 222 alike are oriented in a direction (as shown in the figure) that results in a torque transmission force that is largely directed perpendicularly to the walls of the aforementioned pocket (that receives the insert 214 via interference fit). It has been found that this torque transmission force can produce significant stresses in critical regions of the shank 212 due to bending, thus representing a significant place for improvement. For centering and stability. To the extent that the insert 214 is mounted with an interference fit for a purpose of centering and stability, it can be appreciated that elastic deformation of the walls 224 creates stresses in the same areas as stresses caused by torque transmission. As will be appreciated more fully herebelow, broadly contemplated herein are arrangements for a drill where, advantageously, an interference fit is provided between an insert and a shank wherein high torque transmission capability is achieved by positioning the drive walls at a smaller angle (than is the case in FIG. 3) with respect to pocket centering walls.

Figure 4:
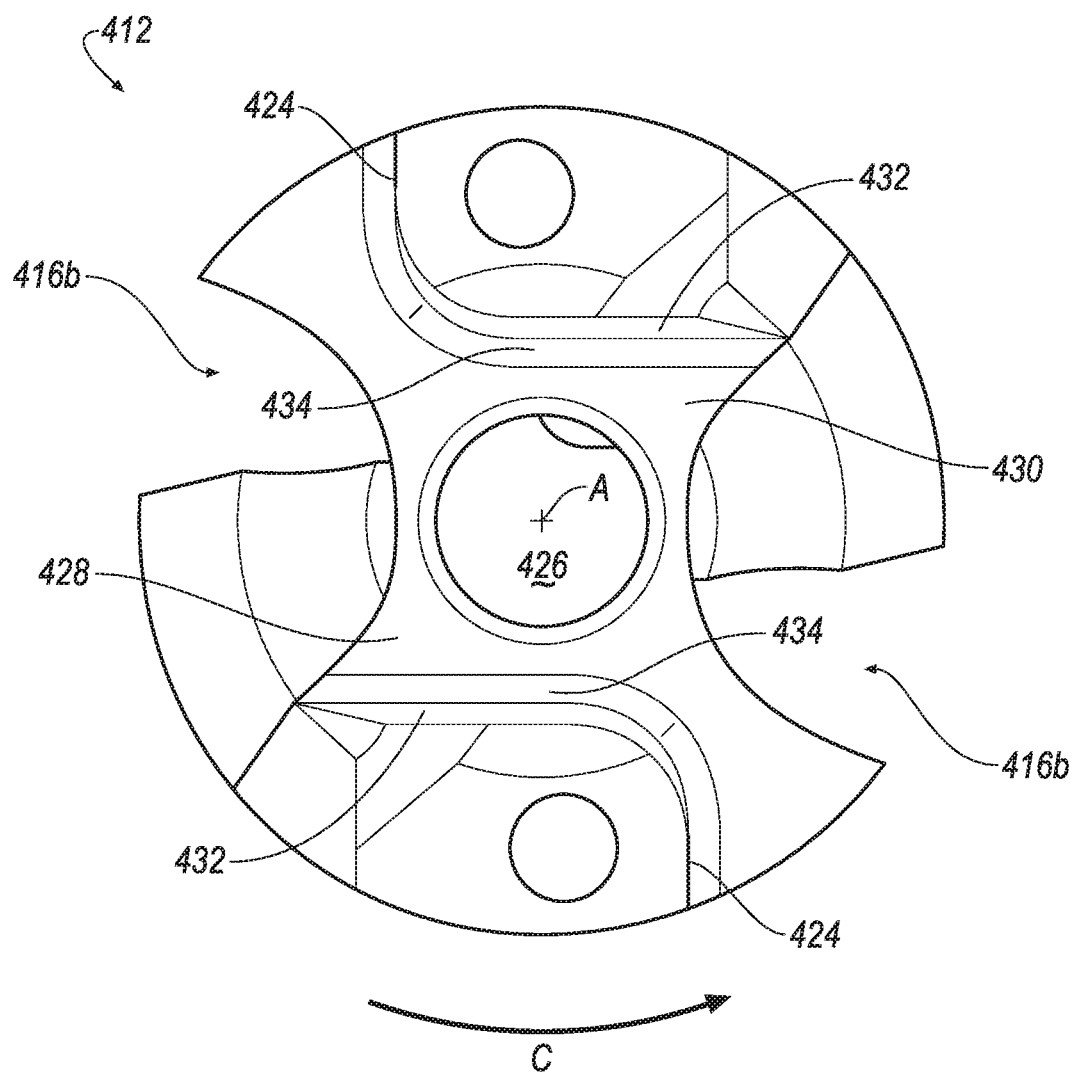
FIG. 4 provides a plan view of a shank.

FIG. 4 provides a plan view of a shank 412 in accordance with at least one embodiment. A pair of flute portions 416*b* are defined in the shank and are configured to interface with compatible flute portions of a cutting insert. Shank 412 includes a pocket 428 for accommodating a cutting insert; the principal elements of the latter include two centering walls 432 interconnected by a floor 430. The floor 430 can be oriented transversely with respect to central longitudinal axis A. Any or all of central floor portion 430 and centering walls 432 serve as abutment surfaces which contact a cutting insert when the cutting insert is installed on shank 412. As shown, a central (blind) hole or opening 426 is disposed centrally in the floor 430 (about axis A), and is configured to receive a centering pin of a cutting insert.

In a manner to be appreciated more fully below, the centering walls 432 deform to receive compatible portions of a cutting insert via an interference fit. Preferably, the centering walls 432 (or at least a portion thereof) are each inclined at an angle with respect to the central longitudinal axis A, inclined away from axis A in progressing toward a leading end of the shank 412. In accordance with at least one embodiment, as shown in FIG. 4, centering walls 432 are substantially straight (while inclined as noted), and parallel to one another, when viewed in a given, single horizontal plane that is transverse to axis A. (Here, it can also be understood that the centering walls 432 would, by extension, also be inclined with respect to that plane transverse to the axis A.)

In accordance with at least one variant embodiment, centering walls 432 may each be curved when viewed in a given, single horizontal plane that is transverse to axis A. In such variants, merely by way of illustrative and non-restrictive example, each wall 432 may be oriented along an arc that is substantially parallel to a circumference of the greater shank 412. Accordingly, taken together, such walls 432 would trace a generally frustoconical shape, narrowing as a function of proximity (in an axial direction) to the pocket floor 430.

Also shown in FIG. 4 are torque transmission walls 424 which, unlike the conventional example of FIG. 3, are configured and disposed to transmit a force to compatible drive surfaces of a cutting insert in a in a direction substantially parallel to the centering walls 432 This represents a significant improvement over the conventional example of FIG. 3, in that stresses produced in each of several critical areas of the pocket 428, of other portions of the shank 412, and of a cutting insert mounted therein, are considerably reduced.

Further advantages may be found in connection with insertion of a cutting insert into pocket 428. Here, to the extent that centering walls 432 end up deflecting radially outwardly with respect to axis A, such deflection may be transmitted to the torque transmission walls 424. However, in so doing, the torque transmission walls will deflect virtually in parallel to a radial direction with respect to axis A or very close thereto, essentially along their own horizontal dimension (that is, their dimension that is transverse to the axis A). This helps maintain face-to-face contact with drive surfaces of the cutting insert being clamped. In contrast, with a conventional arrangement such as that shown in FIG. 3, the torque transmission walls 224 therein shown will more or less deflect in a radial direction with respect to axis A, thus jeopardizing full face-to-face contact with cutting insert drive surfaces (such as those indicated at 222 in FIG. 3).

In the arrangement shown in FIG. 4, torque transmission walls 424 are oriented in parallel with respect to the central longitudinal axis A, when viewed in a generally longitudinal direction. In at least one variant embodiment, the walls 424 may be inclined with respect to the central longitudinal axis A (e.g. at an angle of between about 0 and about 10 degrees, preferably between about 2 and about 6 degrees, and/or may match the inclination of centering walls 432), in a direction opposite to the rotational cutting direction C of the shank 412, toward the leading end of the shank 412). (Here, it can be understood that in such a variant the torque transmission walls 424 would, by extension, also be inclined with respect a plane transverse to the central longitudinal axis.) Shallow semi-cylindrical troughs 434 may run along a bottom of each of the centering walls 432 and torque transmission walls 424, respectively; the troughs 434 can assist in reducing the stresses applied to the pocket 428 and to an insert alike.

In accordance with the aforementioned variant embodiment, when walls 424 are inclined with respect to axis A, it should be noted that when an insert is first positioned in the pocket 428, before clamping, the centering walls 432 and corresponding surfaces on the insert will make contact; there will be a gap between the insert and pocket floor 430 at that point. At the same time, there will be exist at that point another gap (though a significantly smaller one) between drive surfaces of the insert (e.g., such as drive surfaces 722 of the insert 714 shown in FIGS. 7A and 7B) and torque transmission walls 424. In this manner, when the insert is clamped and the centering walls 432 expand outwardly, the torque transmission walls 424 and corresponding drive surfaces on the insert may come into contact before any torque is applied to the insert (e.g., as may be applied in a subsequent drilling operation).

Generally, it can be appreciated with regard to various embodiments herein that an insert, when fully clamped in a shank (such as 412), the insert may contact the pocket floor 430, or there may indeed be a small gap between a bottom portion of a main head portion of the insert and the floor 430. Accordingly, while various views herein may not explicitly illustrate such a gap (e.g., for general ease of illustration), it should be understood and appreciated that such a gap can be considered to be present in accordance with one or more embodiments and/or variants.

Figure 5:
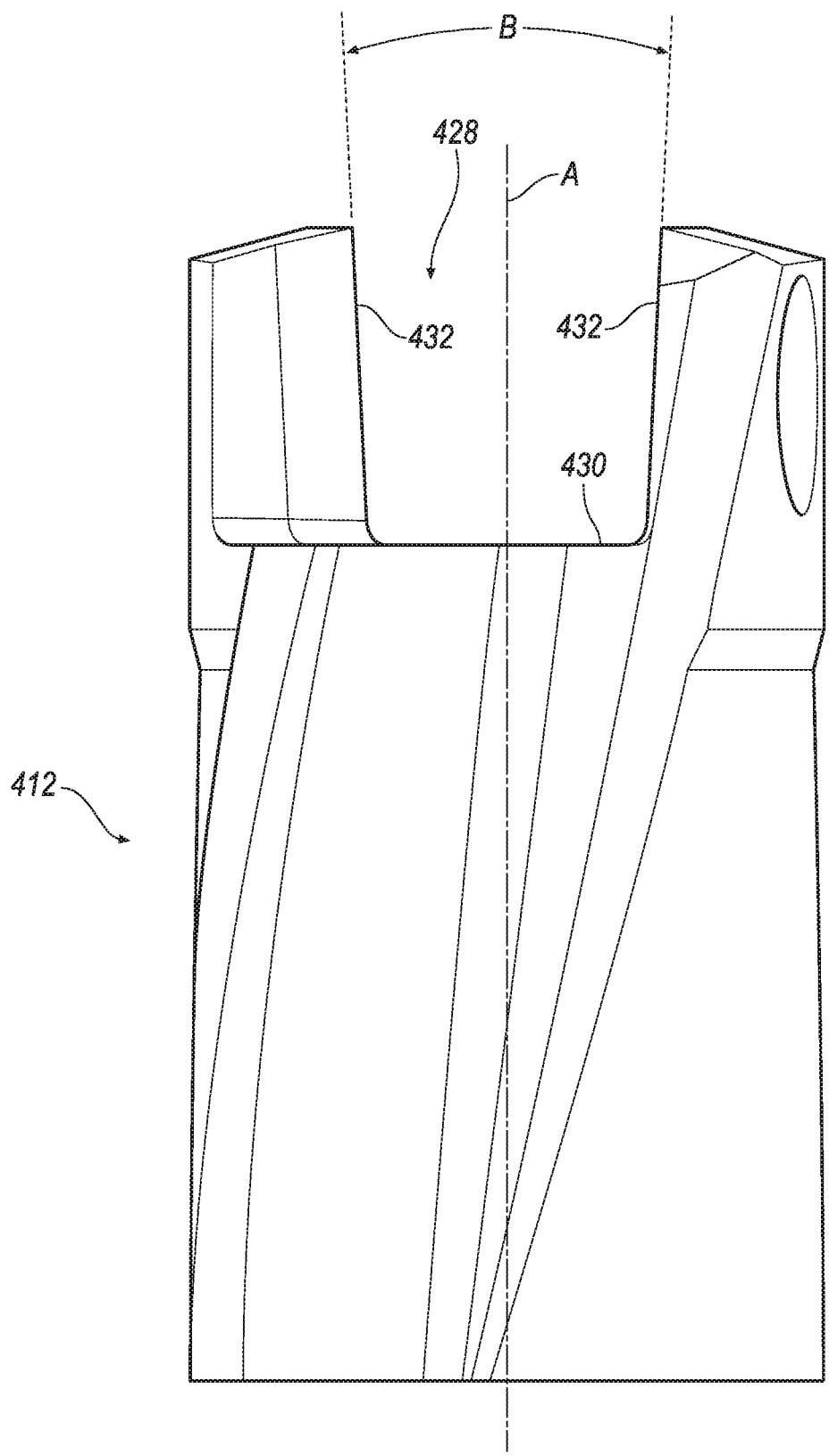
FIG. 5 provides an elevational view of the shank of FIG. 4.

FIG. 5 provides an elevational view of the shank 412 of FIG. 4. As shown, the centering walls 432 can be inclined symmetrically with respect to axis A and at a mutual angle B with respect to one another. The angle B could represent an angle of between about 3 and about 6 degrees, or alternatively could be defined as imparting to each wall 432 a slope of between about 1:20 and about 1:10. It should be understood and appreciated that, when being installed, a cutting insert initially will sit on centering walls 432 at a distance from the pocket floor 430 before it is fully clamped within the pocket 428. Accordingly, elastic deformation of the centering walls 432 will occur as the insert is pulled against the floor 430. (Further details relating to a clamping action, in accordance with at least one embodiment, will be better appreciated from the discussion further below.)

It can be further appreciated, in accordance with at least one embodiment, that with angled centering walls 432 as discussed above, interference caused upon initial insertion of a cutting insert will give rise to a relatively small displacement that then will be needed in fully clamping the insert within pocket 428 and in bumping-off the insert in order to then remove the insert. This stands in stark contrast to conventional arrangements with straight centering walls (relative to axis A) which typically give rise to a relatively larger displacement needed for fully clamping an insert within a pocket, and in then bumping-off the insert.

In accordance with at least one embodiment, as shown in FIG. 5, substantially the entirety of each centering wall 432, extending axially upwardly from the pocket floor 430 to the leading end of shank 412, is inclined as shown. In accordance with at least one variant embodiment, a lower portion of each centering wall 432 (i.e., a portion axially closer to pocket floor 430) is either not inclined at all (i.e., is parallel) with respect to axis A or is inclined at a different angle with respect to axis A than is an upper portion of each centering wall 432. In such variants, the upper portions of centering walls 432 can be understood to assume the angle B discussed above, and would still represent surfaces initially contacted by an insert, as the insert is received in pocket 428. In such variants, preferably at least about 50 to 75 percent of the axial extent of each centering wall 432 is represented by an upper portion which is inclined to assume the angle B discussed above.

Figure 6:
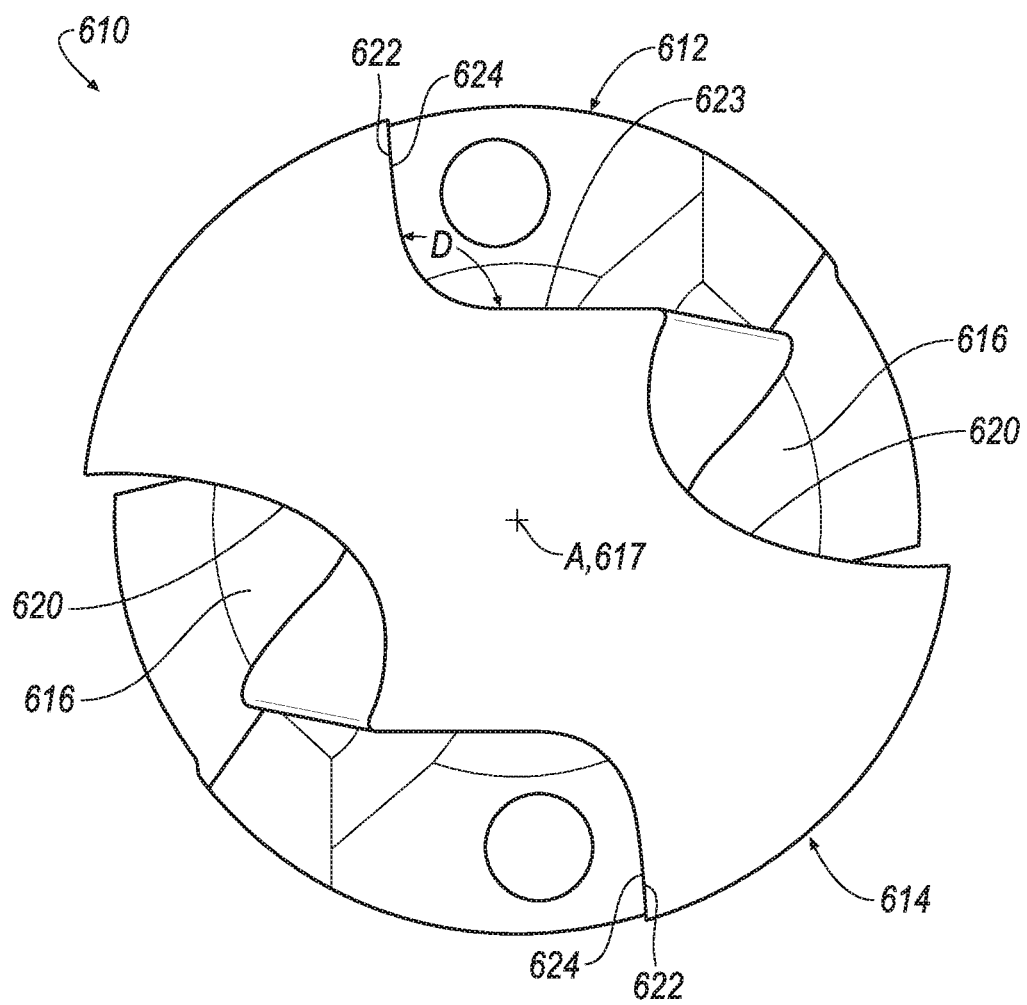
FIG. 6 provides a plan view of a shank and cutting insert installed therein.

FIG. 6 provides a plan view of a shank 612 and cutting insert 614 installed therein, in accordance with at least one embodiment. As shown, the cutting insert 614 includes drive surfaces 622 that are oriented to be compatible with torque transmission walls 624 of the shank 612. Preferably, when viewed transversely with respect to axis A (as indeed shown in FIG. 6), surfaces/walls 622 and 624 alike can be oriented such that a driving force is transmitted generally in a direction substantially parallel to the centering walls. As such, surfaces/walls 622 and 624 alike can be oriented at an angle D with respect to centering walls of the shank 612 (such as those indicated at 432 in FIGS. 4 and 5), and thus to a corresponding surface or side 623 of insert 614. By way of illustrative example, D could be between about 75 and about 120 degrees, or preferably between about 85 and about 100 degrees; most preferably, D can be approximately 90 degrees. It should be appreciated, in this vein, that a workable balance can preferably be found in choosing angle D, in that larger angles will tend reduce to stresses on insert 614 and increase stresses on the pocket (defined via centering walls of the shank 612), while smaller angles will tend to reduce stresses on the pocket (of shank 612) and increase stresses on the insert 614. It should be further appreciated that an arrangement such as that shown in FIG. 6 stands in stark contrast to that shown in FIG. 3, where an angle analogous to D would be well over 120 degrees, not even far from 180 degrees.

Generally stated, in accordance with at least one embodiment, the torque transmission walls 624 (and preferably the drive surfaces 622, when insert 614 is mounted in shank 612) can each be oriented at a predetermined angle (e.g., angle D) with respect to a defining dimension of at least one centering wall portion of shank 612 (which may be analogous to one or more centering walls such as those indicated at 432 in FIGS. 4 and 5). If the at least one centering wall portion is substantially straight when viewed in a given, single horizontal plane that is transverse to axis A, the defining dimension can be understood as a dimension in parallel with respect to the at least one centering wall portion. If, in accordance with at least one variant embodiment as described further above, the at least one centering wall portion is curved when viewed in a given, single horizontal plane that is transverse to the axis A (and, e.g., along an arc that is substantially parallel to a circumference of the greater shank 612), then the defining dimension can be understood as a tangent of the curvature of the at least one centering wall portion at a midpoint of the at least one centering wall portion.

Figure 7A:
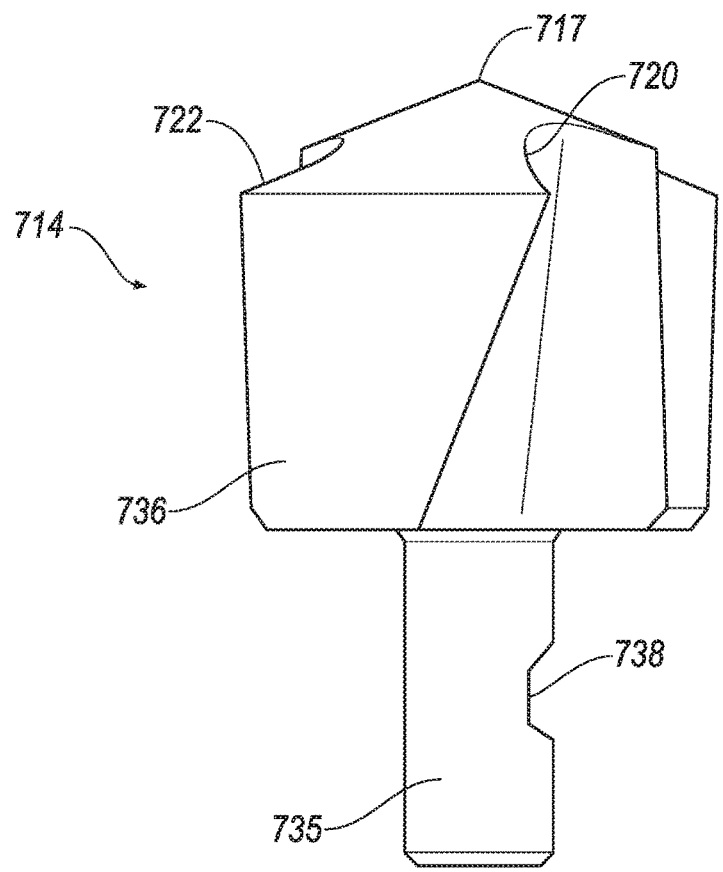
FIG. 7A provides an elevational view of a cutting insert.

FIG. 7A provides an elevational view of a cutting insert 714, in accordance with at least one embodiment. As shown, a generally cylindrical centering pin 735 extends axially away from a main head portion (or head) 736. A recess (or notch) 738 is provided in the shaft portion 735 to accommodate a setscrew, in a manner to be more fully appreciated herebelow. Such a recess can be configured in any suitable manner; by way of illustrative and non-restrictive example (and indeed as shown in FIG. 7A), it could be defined by a relatively flat surface oriented in parallel to a chord or secant defined by the cylindrical pin 735, flanked on the two axial sides by angled surfaces, one per side, that converge on the flat surface from an external circumference defined the pin 735. Also shown in FIG. 7A are cutting edges 720, drive surfaces 722 and a cutting tip 717 which may be regarded as analogous to similar components described and illustrated elsewhere herein. In a variant embodiment, two symmetrical notches/recesses 738 may be provided, disposed diametrically opposite from one another with respect to shaft portion 735.

Figure 7B:
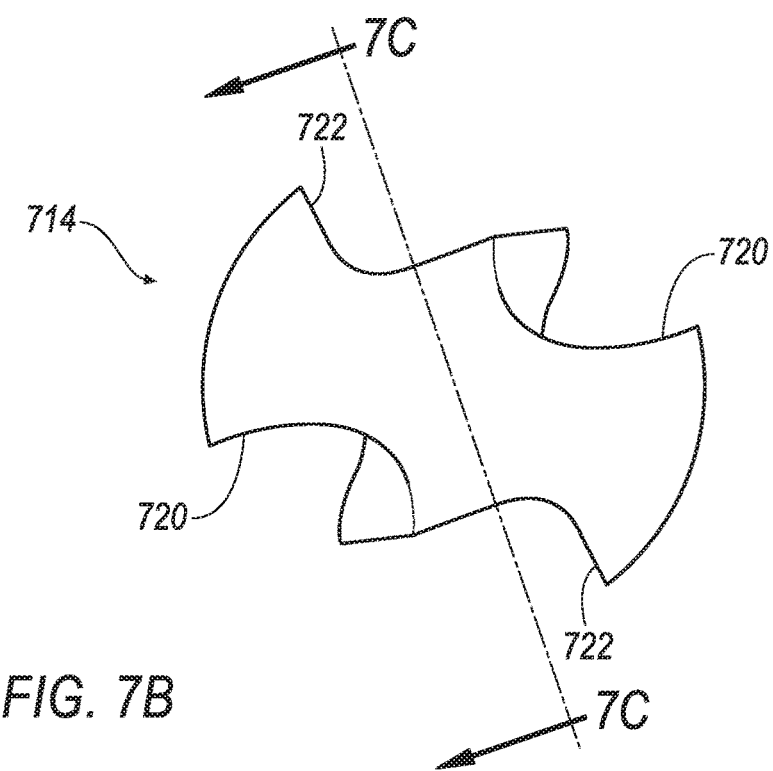
FIG. 7B provides a plan view of the cutting insert of FIG. 7A.

FIG. 7B provides a plan view of the cutting insert 714 of FIG. 7A. As shown, the drive surfaces 722 may be oriented in similar fashion to those indicated at 622 in FIG. 6.

Figure 7C:
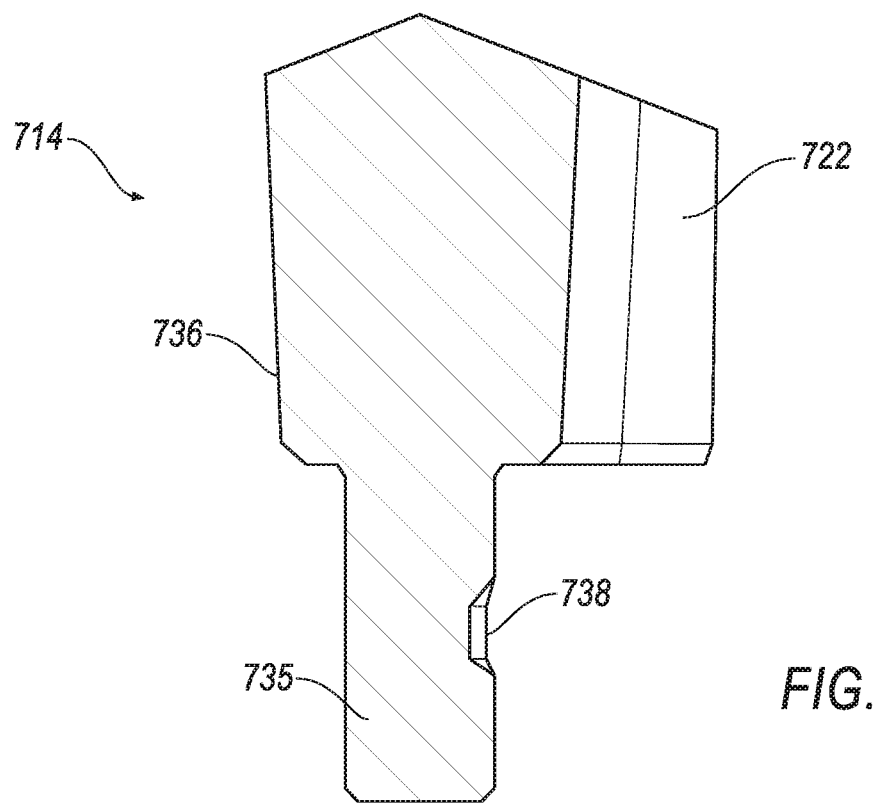
FIG. 7C provides an axial section taken through the line 7C-7C in FIG. 7B.

FIG. 7C provides an axial section taken through the line 7C-7C in FIG. 7B. Here, in particular, some viable proportional dimensions of recess 738 are shown.

Figure 7D:
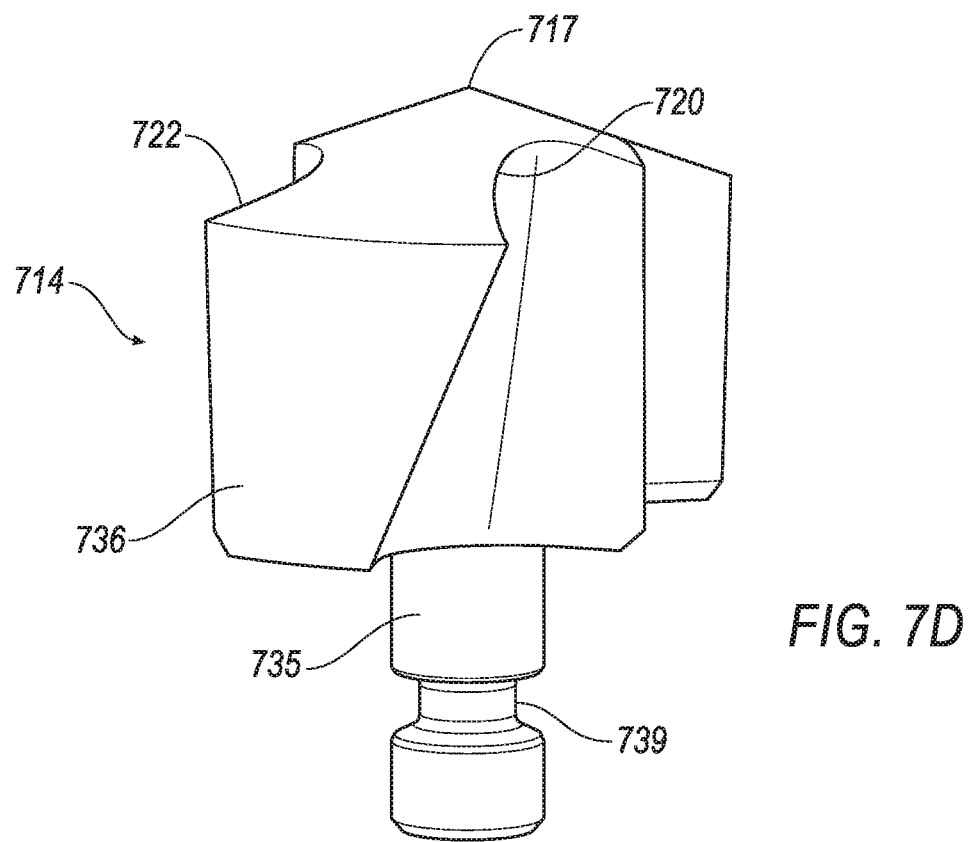
FIG. 7D provides an elevational view of a cutting insert, in accordance with at least one variant embodiment.

FIG. 7D provides an elevational view of a cutting insert 714, in accordance with at least one variant embodiment. Here, in place of the recess/notch 738 from FIGS. 7A-7C, there is an annular groove 739 for accommodating a setscrew. As shown, annular groove 739 may be recessed into centering pin 735 about an entire circumference of pin 735. Groove 739 may further be defined, substantially as shown, by an inner cylindrical surface (of lesser diameter than the remainder of centering pin 735 itself), flanked on the two axial sides by frustoconical surfaces, one per side, that converge on the inner cylindrical surface from an external circumference defined by the pin 735.

Figure 8:
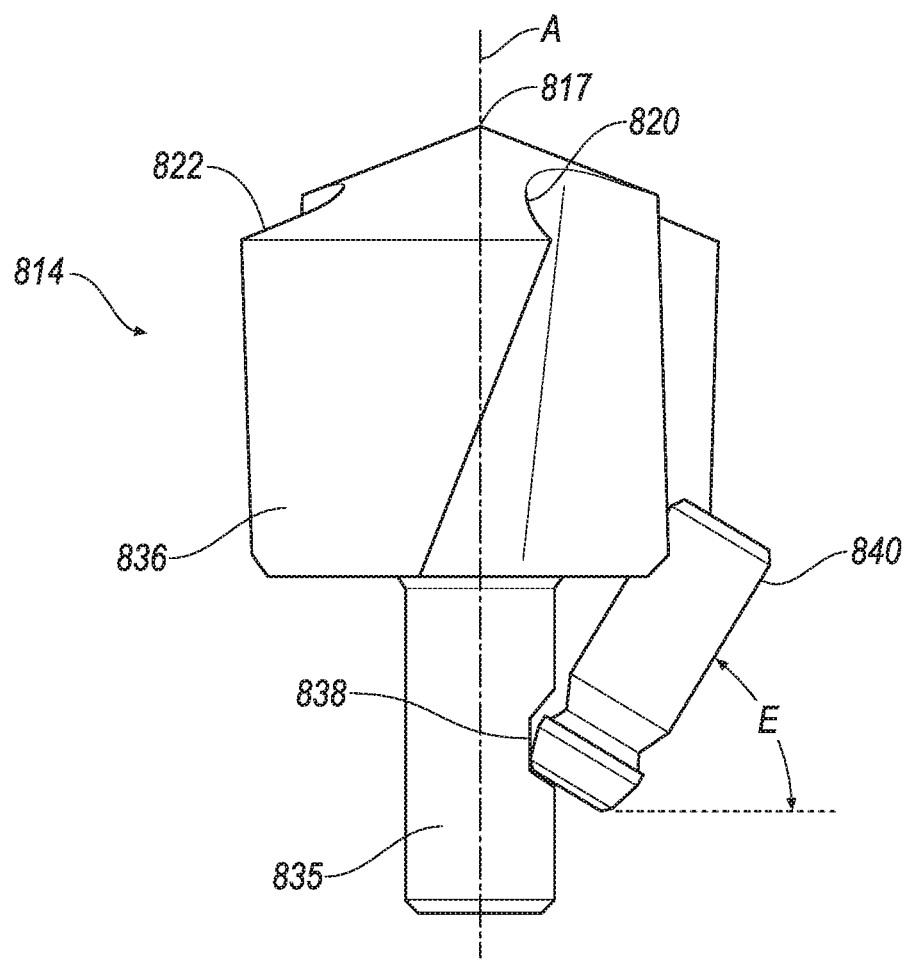
FIG. 8 provides essentially the same elevational view as FIG. 7A, but additionally showing an angled setscrew.

FIG. 8 provides essentially the same elevational view as FIG. 7A, but additionally showing an angled setscrew 840 in accordance with at least one embodiment. As shown, setscrew 840 may be inclined at an angle E with respect to the horizontal (i.e., to a plane which is transverse to axis A), to engage the recess 834 in a manner to be more fully appreciated herebelow. Setscrew 840, for its part, may be threadedly engaged in a compatible channel in order to translate in parallel to its own central longitudinal axis. To this end, it may be actuated at a rear portion thereof (i.e., at that end portion disposed away from recess 838), via a wrench tool or other arrangement that can displace the setscrew 840 in a rotational direction (about its own central longitudinal axis) to thereby translate the setscrew 840 via the aforementioned threaded engagement.

Figure 9A:
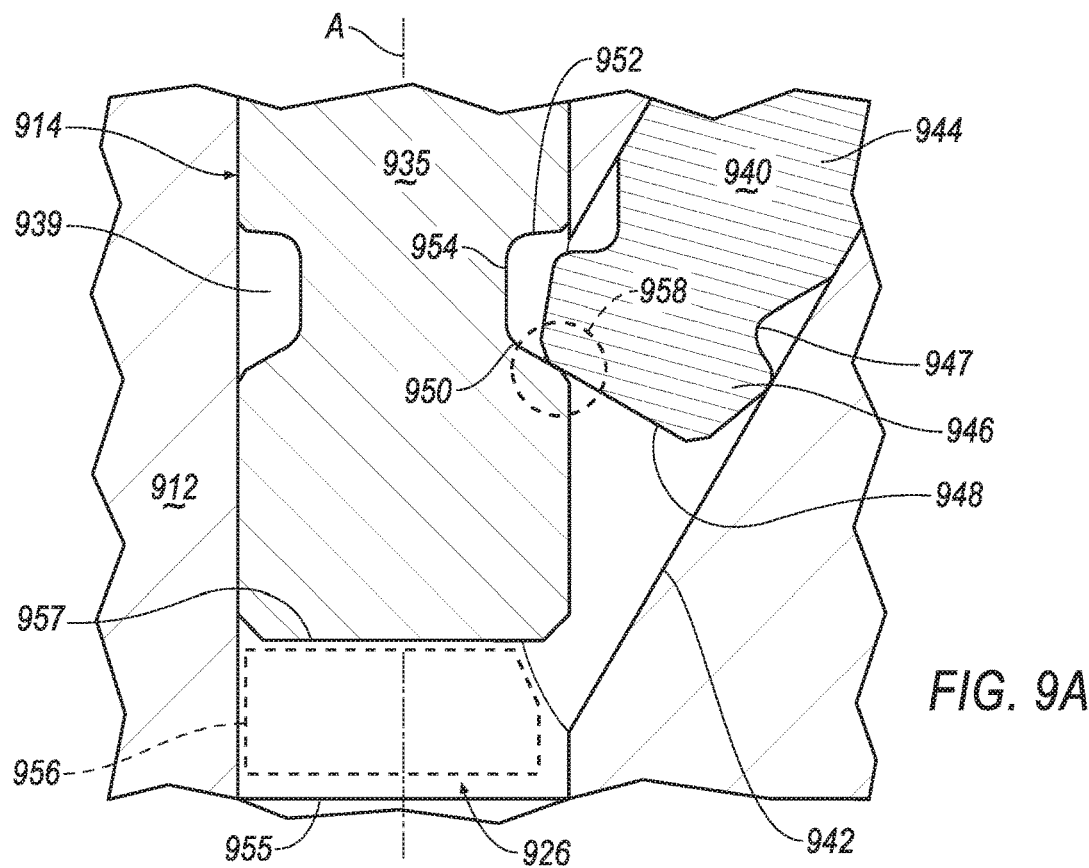
FIG. 9A schematically illustrates, in an elevational cross-sectional view, a cutting insert and a setscrew in an initial position for assembly FIG. 9B schematically illustrates the cutting insert and a setscrew of FIG. 9A, but in a "clamped" position.

In accordance with at least one embodiment, FIG. 9A schematically illustrates, in an elevational cross-sectional view, a cutting insert 914 and a setscrew 940 in an initial position for assembly. While in this illustration the centering pin 935 (of insert 914) includes an annular groove 939 (e.g., similar to that indicated at 739 in the view of FIG. 7D), it should be understood that the ensuing discussion can also apply to the case of engaging with a recess or notch, e.g., similar to the one indicated at 738 in FIG. 7A.

As shown in FIG. 9A, setscrew 940 may be disposed in a dedicated channel (or hole) 942 in a manner to reciprocally translate within the channel/hole 942. As noted above, such movement may be promoted via mutual threaded engagement between setscrew 940 and channel/hole 942, but in accordance with at least one variant embodiment the setscrew 940 may be slidingly disposed within the channel/hole 942. In accordance with at least one other variant embodiment, the setscrew 940 and channel/hole 942 may be configured such that part of the reciprocal movement is via threaded engagement and part of such movement is via sliding displacement.

For its part, in accordance with at least one embodiment, the setscrew 940 includes a main shaft portion 944 and a head portion 946, with a narrowed neck region 947 disposed therebetween. Head portion, as shown, may be tapered (e.g., via a frustoconical outer surface) in a direction generally toward the insert 914. A distal end of setscrew 940 (i.e., an end disposed toward the insert 914 with respect to an axial direction of the setscrew 940) may also be defined by a flat, circular end surface 948.

In accordance with at least one embodiment, groove 939 may include a first angled surface 950 (disposed toward a trailing end of centering pin 935), a second angled surface 952 (disposed toward a leading end of centering pin 935) and an inner cylindrical wall 954 extending therebetween. As such, first angled surface 950 may be dimensioned so as to engage with the end surface 948 of setscrew 940 as shown (in the initial position for assembly). It should be understood and appreciated that similarly configured and disposed surfaces may be provided the case of a recess that does not extend fully about a circumference of centering pin 935 (e.g., such as recess 738 in FIG. 7A). Further, while angled surfaces 950/952 and cylindrical wall 954 are shown and described by way of non-restrictive and illustrative example, it should be understood that variants on these may be employed. For instance, wall 954 need not necessarily be cylindrical, e.g., it may be inclined with respect to axis A and even could assume two or more distinct portions along an axial dimension. Angled surfaces 950/952 may, themselves, be angled differently than shown in FIG. 9A and could even run strictly transversely with respect to axis A.

Figure 9B:
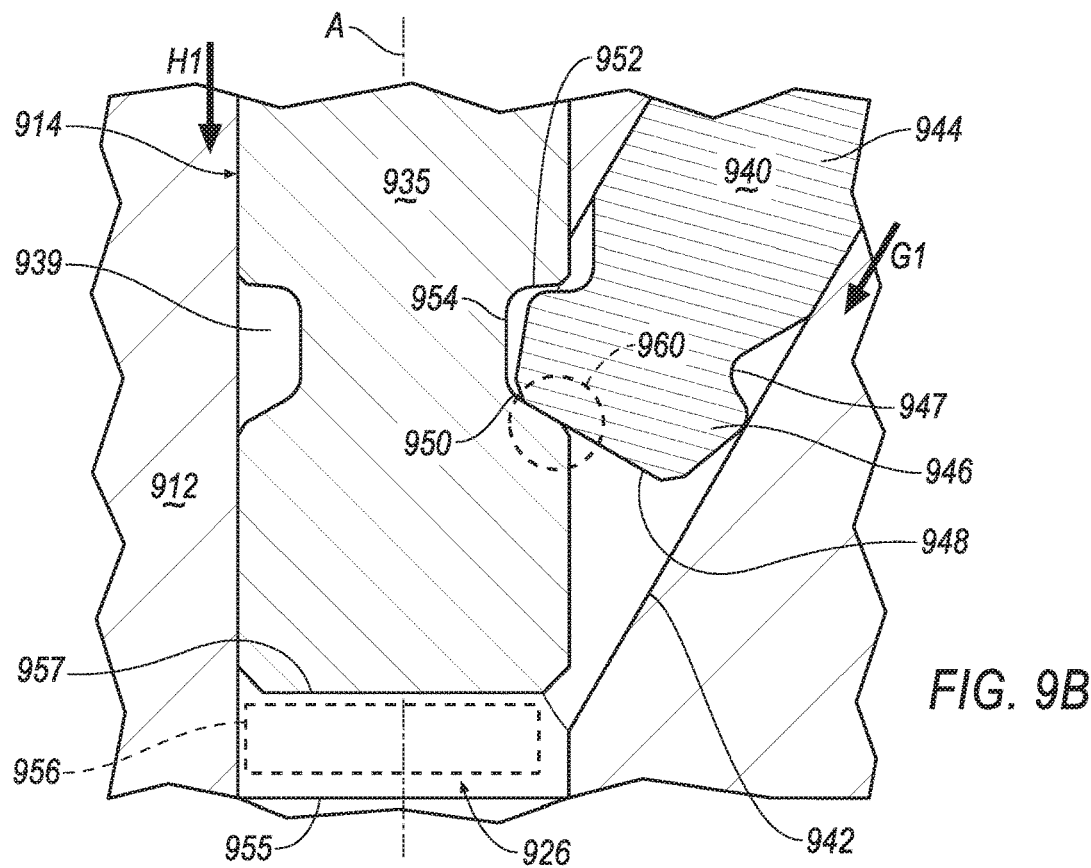
FIG. 9C schematically illustrates the cutting insert and a setscrew of FIG. 9A, but in a position set for "bump-off" or disassembly FIG. 10 provides a plan view of a shank in accordance with at least one variant embodiment, including a wrench tool for displacing a cutting insert.

In accordance with at least one variant embodiment, setscrew 940 may be configured without a narrowed neck region 947 such that it merely terminates, at its distal end, via a beveled outer surface that converges to a flat, circular end surface. In such a variant, "bump-off" can be undertaken by way of a wrench tool such as that indicated at 1070 in FIG. 10 (and as described in further detail herebelow). For clamping, the setscrew can be positioned at an angle E (as referenced in FIG. 8) such that either the end face thereof sits on surface 950, or the beveled/frustoconical outer surface of the setscrew sits on surface 950; either way, this can create an axial clamping force that still urges the cutting insert 914 in direction H1 as shown in FIG. 9B.

As shown, the shank includes a central hole 926 for accommodating the centering pin 935 of cutting insert 914. Preferably, the centering pin 935 will have a precise slide fit with respect to the central hole 926. As such, the side component of the clamping force created by the setscrew 940 will be supported by the wall of hole 926, thus preventing excessive displacement of the pin; it can be appreciated that any such excessive displacement could otherwise cause the insert 914 to lose its concentricity with the axis of rotation A, and/or cause breakage of the pin 935. The combination of a precise fit between pin 935 and hole 926, in conjunction with the interference fit between insert 914 and a pocket of shank 912 (such as pocket 428 in FIG. 4) will ensure that the insert 914 is clamped in a correct position and remains stable in its position during operation. As such, it can be appreciated that in at accordance with at least one embodiment the hole 926 and pin 935 may assume a circular cross-section when viewed two-dimensionally (in a plane transverse to axis A), and a generally cylindrical configuration when viewed three-dimensionally. However, in accordance with at least one variant embodiment, the hole 926 and pin 935 may assume any of a wide variety of other possible two-dimensional cross-sectional shapes, e.g., an oblong (stadium) or elliptical shape.

The central hole 926 may also include a lowermost portion (toward the trailing end of shank 912), or floor 955. To help ensure that the pin 935 (and of cutting insert 914) initially sits at a predetermined position for proper engagement with the front portion 946 of setscrew 940, a deformable element 956 may be provided between that lowermost surface 957 and the floor 955. Preferably, the deformable element 956 biases the centering pin 935 upwardly (i.e., toward a leading end of shank 912). Merely by way of illustrative and non-restrictive example, the deformable element 956 may take the form of an O-ring, a spring or a ball plunger. In accordance with a variant embodiment, a similar or analogous deformable element may be placed—as an alternative to element 956 or in addition thereto—on the floor of a pocket, such as floor 430 shown in FIGS. 4 and 5; this alternative or additional element would then bias axially upwardly a seating surface of an associated cutting insert.

As shown, in FIG. 9A, the end surface 948 of setscrew 940 contacts the first angled surface 950 of shaft 935 over an initial contact area, itself shown within the dotted circle 958. The manner of engagement between setscrew 940 and shaft 935 then changes in a manner to be appreciated more fully herebelow.

In accordance with at least one embodiment, FIG. 9B schematically illustrates the cutting insert and a setscrew of FIG. 9A, but in a "clamped" position. To achieve a "clamped" position, the setscrew 940 is translated within channel 942 (e.g., via rotation and the aforementioned threaded engagement), in a direction G1, to cause the shaft 935 (and thus the cutting insert 914) to move axially downwardly (i.e., in direction H1). This will cause the entire cutting insert 914 to move axially downwardly in a pocket of the shank 912 (e.g., such as pocket 428 in FIGS. 4 and 5), whereupon centering walls of the pocket (e.g., such as walls 432 in FIGS. 4 and 5) will deform elastically in a radially outward direction (with respect to axis A). This will then promote an interference fit of the insert 914 within shank 912 (as also discussed hereabove), such that the insert 914 is then securely clamped within shank 912. Also, once in the "clamped" position, the deformable element 956 is deformed in an axial direction of the insert 914 and the end surface 948 of setscrew 940 comes to contact the first angled surface 950 over a somewhat larger area (e.g., as denoted within dotted circle 960) than was the case in the initial assembly position (see FIG. 9A, and dotted circle 958).

Figure 9C:
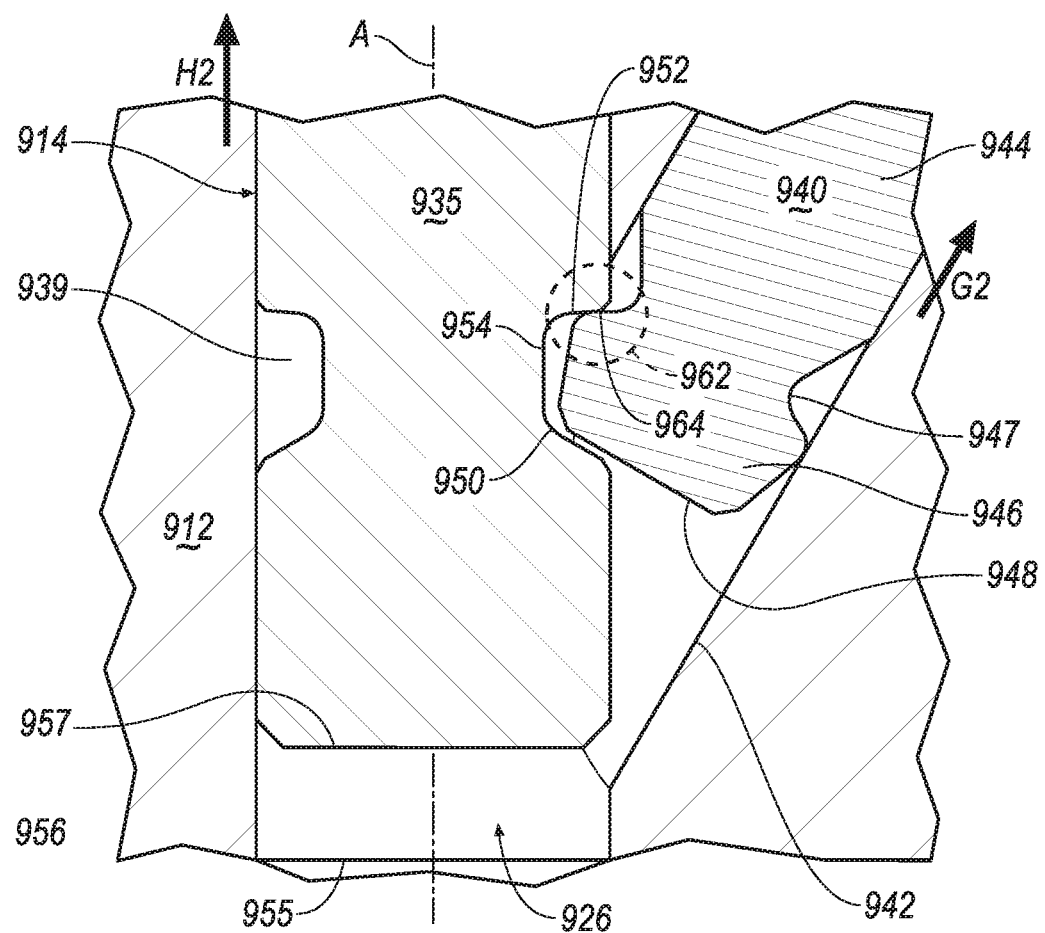

In accordance with at least one embodiment, FIG. 9C schematically illustrates the cutting insert and a setscrew of FIG. 9A, but insert still in a "clamped" position and setscrew already positioned for bump-off. As such, the "bump-off" action takes place when the setscrew 940 undergoes reverse translational movement, as indicated by arrow G2, then (via an upper bump-off surface 964 of head portion 946) contacts the second angled surface 952 in a manner as shown within dotted circle 962. This then causes the centering pin 935 (and cutting insert 914) to displace axially in a "return" direction as indicated by arrow H2. The insert will be pushed out of pocket and must overcome the frictional forces exerted by the pocket walls (due to interference fit).

In accordance with at least one embodiment, the surfaces 952 and 964 described and illustrated with respect to FIGS. 9A-9C may preferably be oriented in a horizontal direction, that is, perpendicular to axis A. This will help facilitate a bump-off force that is applied substantially in an axial direction (H2).

Preferably, surfaces 948 and 950 may be oriented substantially in parallel with respect to one another, in order to facilitate direct engagement in applying and distributing a clamping force, as well as mutual sliding engagement when transitioning between an initial position for assembly(FIG. 9A) and a clamped position (FIG. 9B). Further, both surfaces may preferably be oriented in a direction that is transverse to the angle E referenced in FIG. 8. The angle formed by either or both surfaces (948 and 950) with respect to the horizontal (i.e., a plane perpendicular to axis A), and/or the angle E referenced in FIG. 8, can be determined in a manner deemed suitable on the basis of different factors including, but not limited to: available, needed or desired physical dimensions of the setscrew 940 and/or channel/hole 942; and a desired or needed clamping force as applied by setscrew 940, with its axial component acting in direction H1.

Available physical dimensions of the setscrew 940 and/or channel/hole 942, for instance, may be constrained by dimension of a pocket of the shank 912 and/or its associated walls (e.g., such as the pocket 428 and walls 432 in FIG. 4). Thus, in theory, while an angle E (as referenced in FIG. 8) may ideally be 90 degrees to ensure a direct application of an axial clamping force (of setscrew 940 on insert 914), with possible angles of zero degrees formed by either of both of surfaces 948/950 with respect to the horizontal (i.e., a plane perpendicular to axis A), in reality various physical constraints may inform an angle E (as referenced in FIG. 8) of no greater than about 70 to about 80 degrees. However, it should be noted that one or more variant embodiments may well make a provision for applying an axial clamping force in a direction more closely in parallel with respect to axis A; this could be achieved, e.g., via a concave or angled end surface of setscrew 940, or via a physical extension of (or component physically attached to) setscrew 940 that extends outwardly from setscrew 940 and itself is oriented in a horizontal direction (i.e., perpendicular to axis A).

Figure 10:
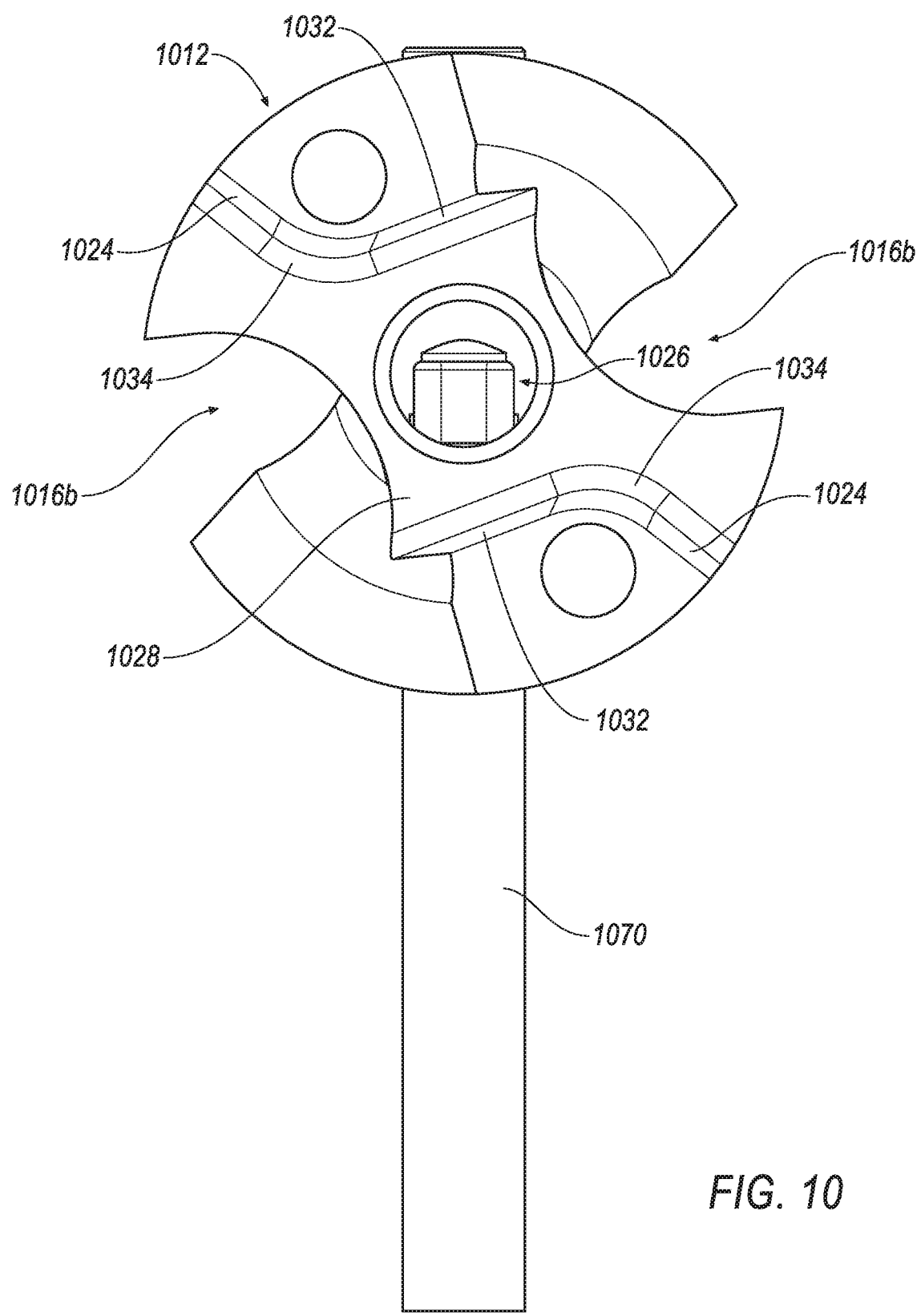

FIG. 10 provides a plan view of a shank 1012 in accordance with at least one variant embodiment, including a wrench tool 1070 for displacing a cutting insert. Here, centering walls 1032 of pocket 1028 may be disposed, configured and oriented similarly to the walls 432 shown in FIGS. 4 and 5. Additionally, in another variant with respect to the main embodiments contemplated with respect to FIGS. 4 and 5, torque transmission walls 1024 may themselves be oriented at a similar vertical angle as centering walls 1032. (Here, it can be understood that the torque transmission walls 1024 and centering walls 1032 alike are inclined with respect to the central longitudinal axis and, by extension, to a plane transverse to the central longitudinal axis.) In a manner to be appreciated more fully below, a dedicated wrench tool 1070 may be employed to effect a type of clamping and bump-off action as described heretofore, and analogously so with respect to the examples of FIGS. 9B and 9C.

Figure 11A:
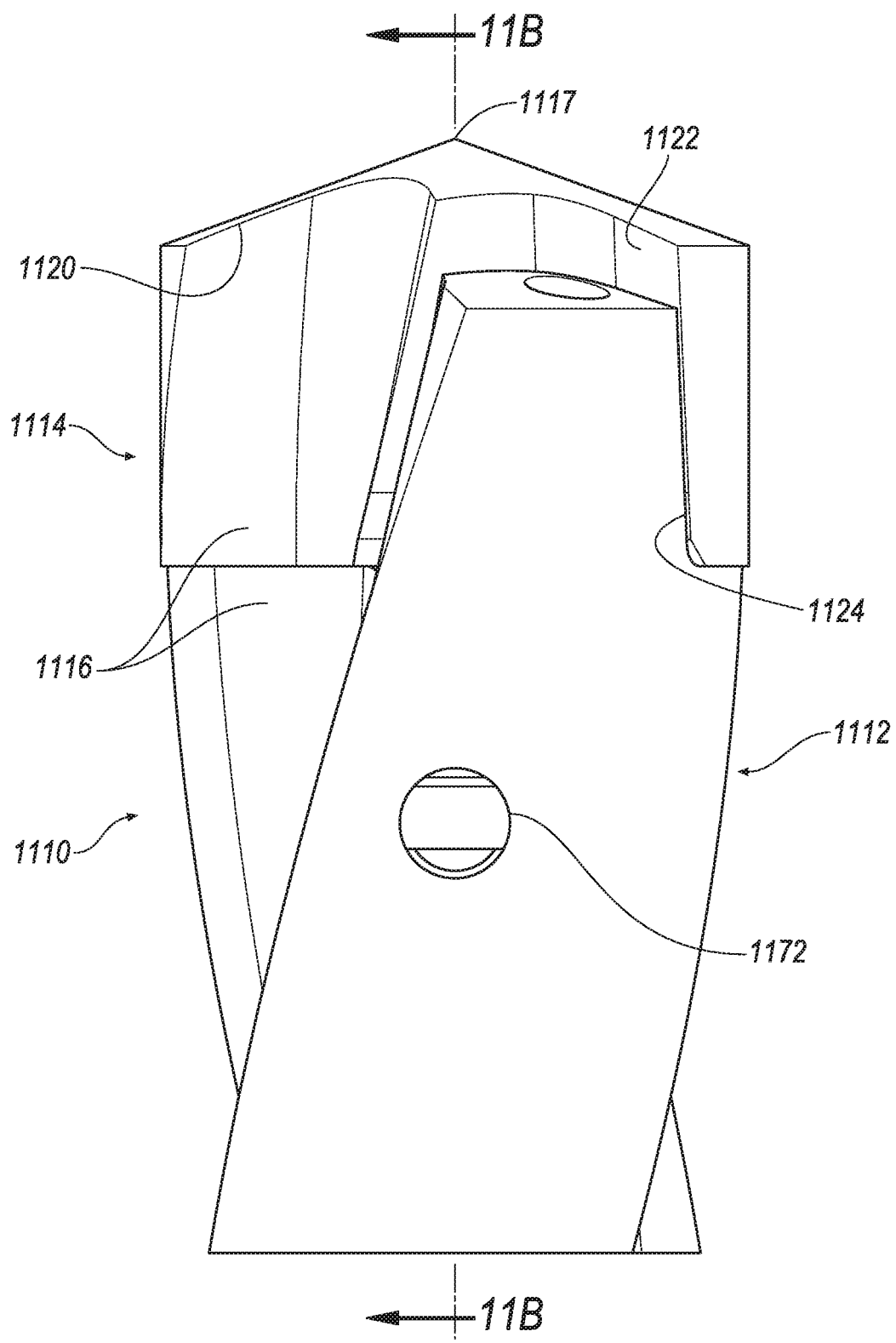
FIG. 11A provides a front elevational view of a shank and cutting insert in a clamped position, in accordance with at least one variant embodiment.

FIG. 11A provides a front elevational view of a shank and cutting insert in a clamped position, in accordance with at least one variant embodiment. As shown, the cutting tool 1110 with shank 1112 and cutting insert 1114 may present general similarities to analogous components shown and described with respect to other embodiments discussed and illustrated herein. However, analogously to FIG. 10 discussed above, a radial hole 1172 for including a wrench tool may also be included, the function of will be appreciated more fully from the ensuing discussion.

Figure 11B:
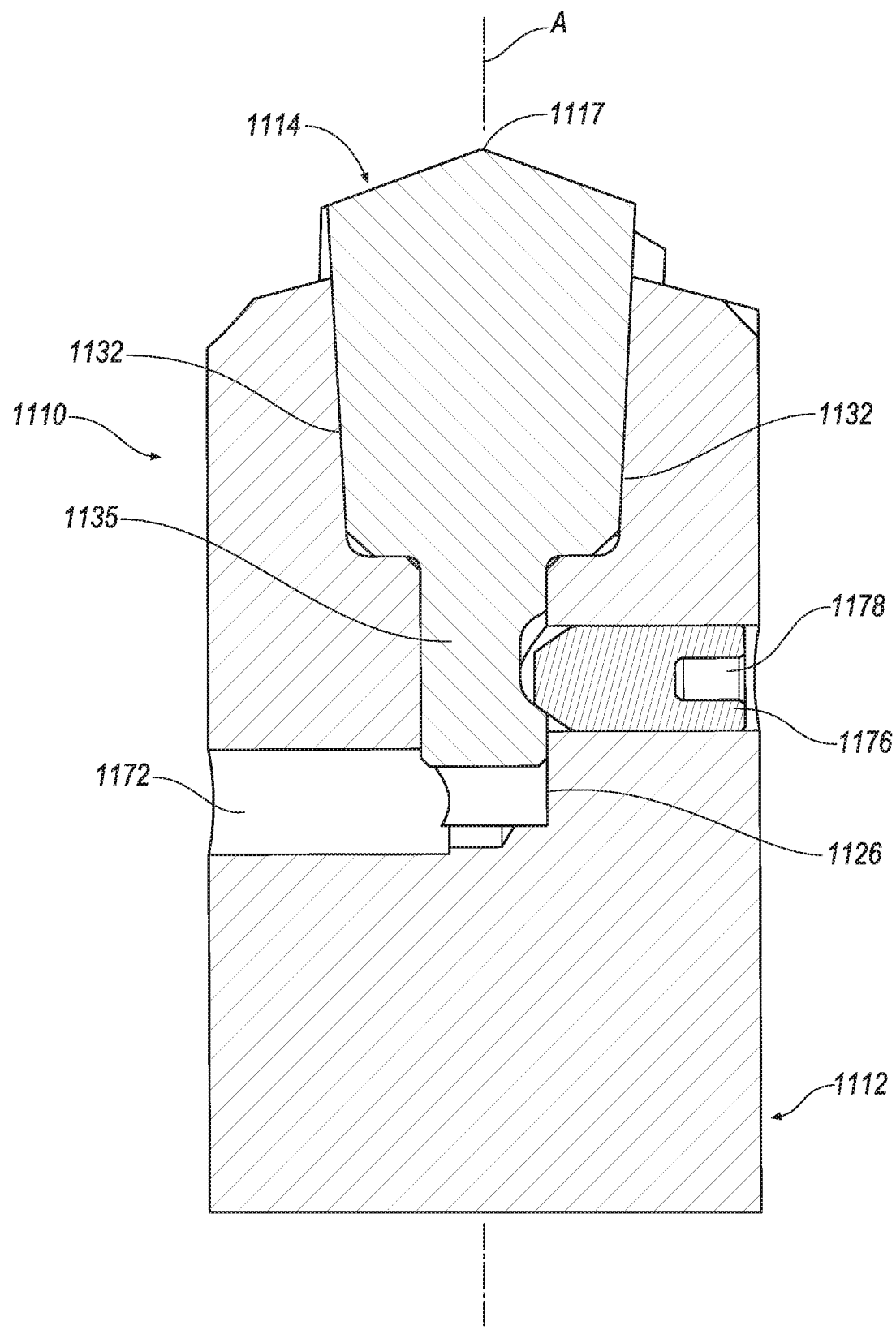
FIG. 11B provides an axial section taken through the line 11B-11B in FIG. 11A.

As such, FIG. 11B provides an axial section taken through the line 11B-11B in FIG. 11A. As shown, radial hole 1172 may be regarded as a blind hole, in that it terminates in the central hole 1126 of shank 1112. Similarly to other embodiments discussed and illustrated herein, centering walls 1132 of shank 1112 may be dimensioned so as to accommodate cutting insert 1114 via an interference fit. As such, a wrench tool (such as that indicated at 1070 in FIG. 10) will be selectively removable and insertable with respect to radial hole 1172; the orientation and function of a wrench tool therein will be better appreciated from further discussion herebelow.

At the same time, there may preferably be provided a setscrew 1176 which is oriented in a horizontal direction with respect to cutting insert 1114, or in a direction that is transverse to central axis A. The setscrew 1176 can reciprocate within its own channel (that extends in a radial direction with respect to the axis A), via threaded engagement between the two. To actuate translational motion of the setscrew 1176 within its own channel, a wrench tool, such as one as indicated at 1070 in FIG. 10, may be employed to rotate the setscrew 1176 about its own rotational axis. To this end, a protrusion of the wrench tool may be inserted in a compatible recess 1178 located at a back end of the setscrew 1176 (i.e., at an end of the setscrew disposed away from the axis A).

It should be appreciated that FIG. 11B illustrates the cutting insert 1114 in a "clamped" position, analogously to FIG. 9B. As will be better appreciated herebelow, "bump-off" is facilitated via rotating a wrench tool (such as that indicated at 1070 in FIG. 10) within radial hole 1172, whereby an end protrusion of the wrench tool contacts a bottom surface of centering pin 1135 and urges the same to move upwardly (i.e., toward the leading edge end the cutting tool 1110). Also, to permit "bump-off", setscrew 1176 should be translated away from central axis A, to permit cutting insert 1114 to move axially upwardly in an unhindered manner.

Figure 12A:
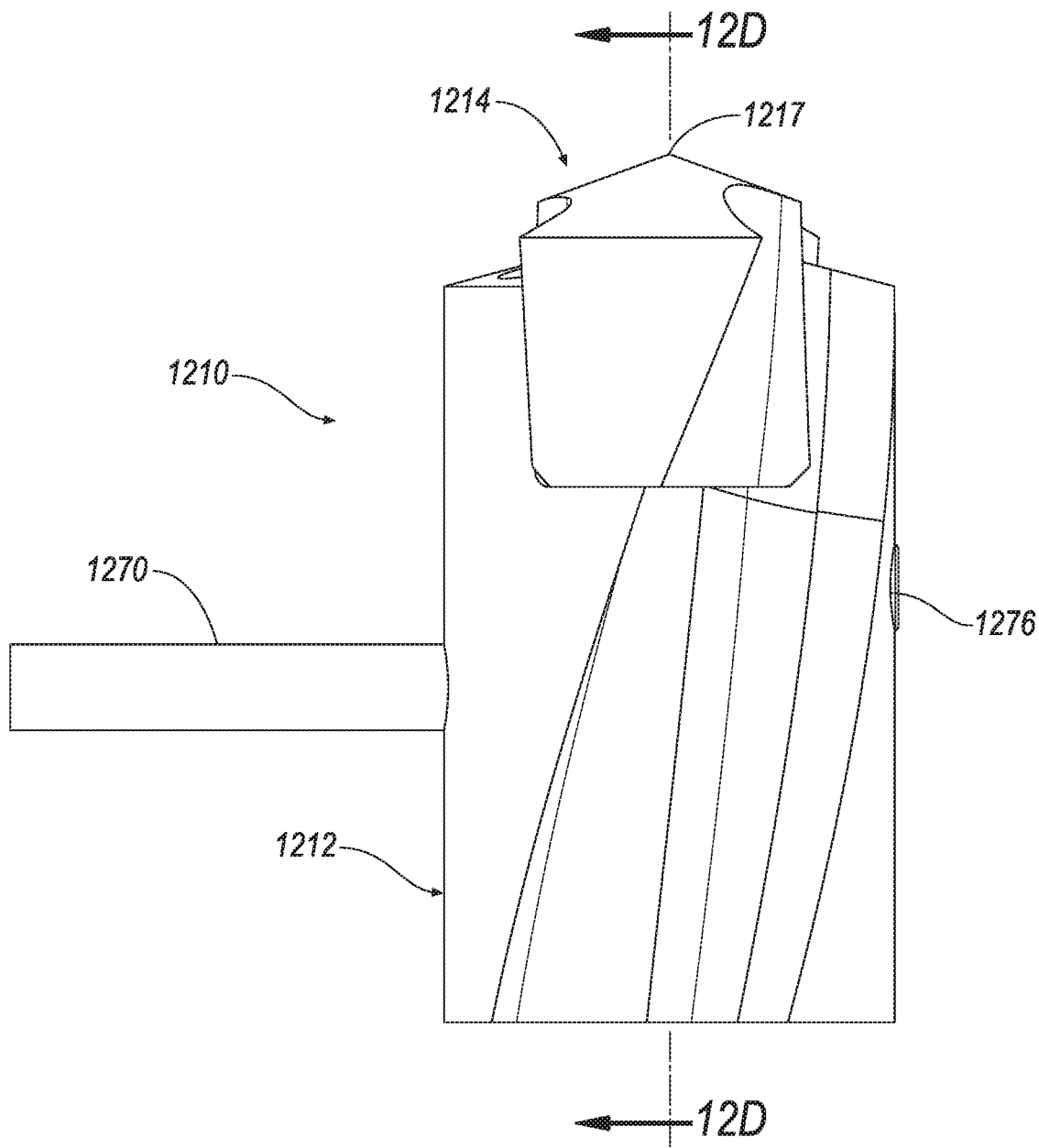
FIG. 12A provides a side elevational view of a shank and cutting insert in accordance with at least one variant embodiment similar to FIG. 11A, but with a wrench tool 1270 inserted, and in a position set for "bump-off" or disassembly.

FIG. 12A provides a side elevational view of a shank and cutting insert in accordance with at least one variant embodiment similar to FIG. 11A, but with a wrench tool 1270 inserted, and in a position set for "bump-off" or disassembly. Again, the cutting tool 1210 with shank 1212 and cutting insert 1214 may present general similarities to analogous components shown and described with respect to other embodiments discussed and illustrated herein, while the function of wrench tool 1270 may be appreciated more fully from the ensuing discussion.

Figure 12B:
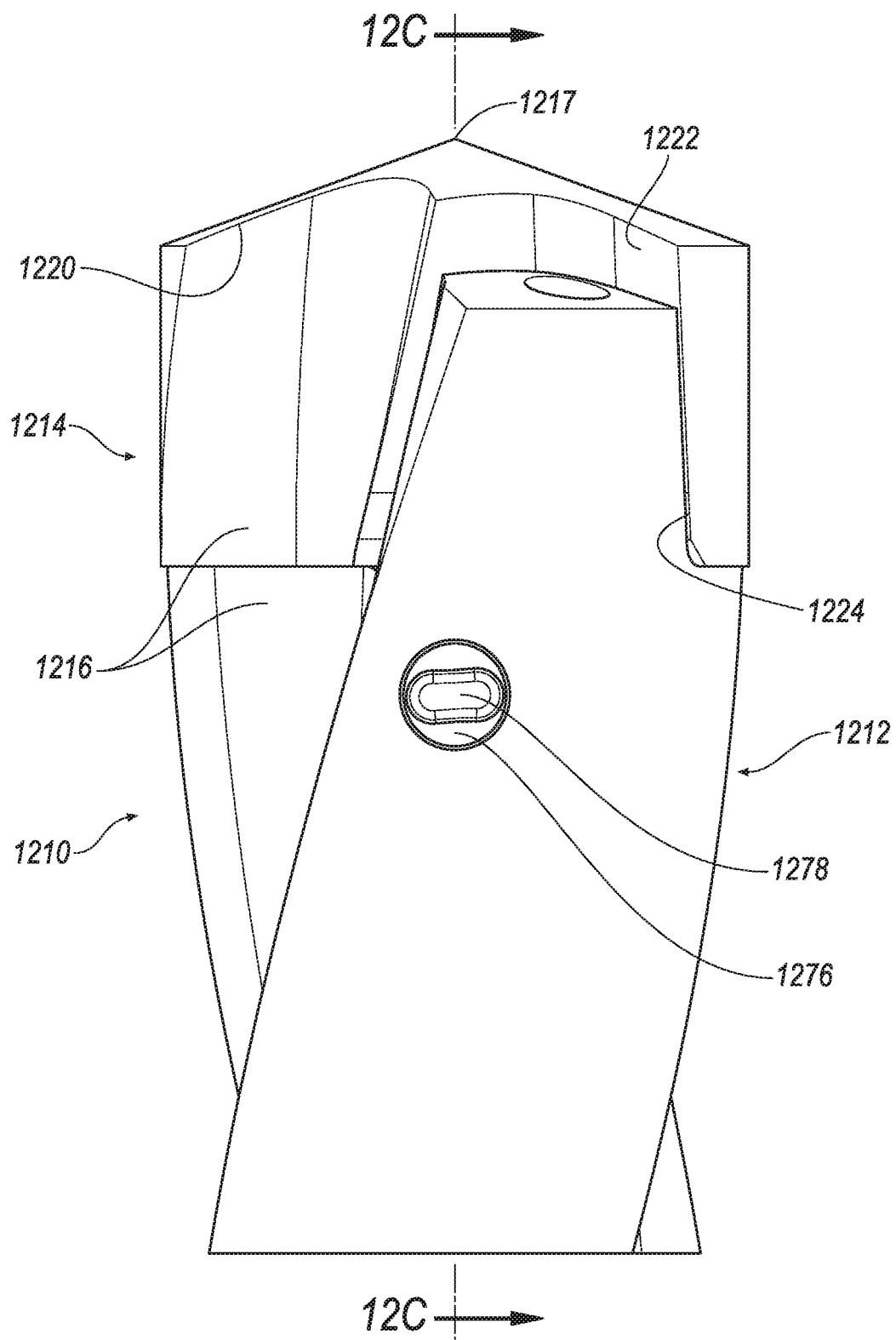
FIG. 12B provides a rear elevational view of the shank and cutting insert shown in FIG. 12A.

FIG. 12B provides a rear elevational view of the shank and cutting insert shown in FIG. 12A. Accordingly, shown here in addition are a setscrew 1276 with a recess 1278, substantially similar to analogous components in FIG. 11B.

Figure 12C:
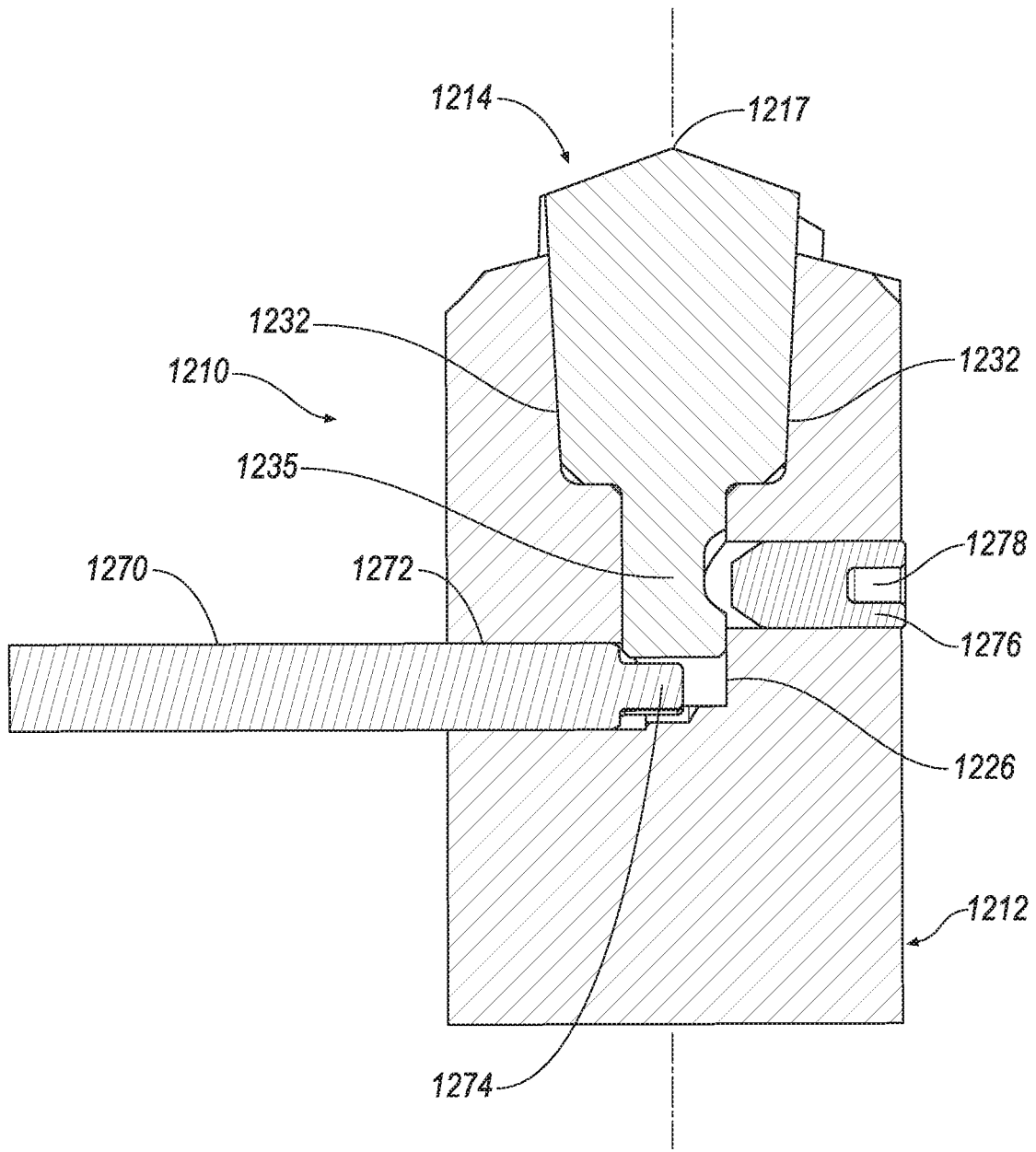
FIG. 12C provides an axial section taken through the line 12C-12C in FIG. 12B.

FIG. 12C provides an axial section taken through the line 12C-12C in FIG. 12B. As shown, the wrench tool 1270 is disposed in radial hole 1272; again, the latter is embodied as a blind hole that terminates in the central hole 1226 of shank 1212. Again, centering walls 1232 of shank 1212 may be dimensioned so as to accommodate cutting insert 1214 via an interference fit. For its part, the wrench tool 1270 is selectively removable and insertable with respect to radial hole 1272, and includes an end protrusion 1274 that may be dimensioned to fit in the space beneath a bottom portion (i.e., a trailing end portion) of centering pin 1235 of insert 1214 as shown in FIG. 11A.

Also shown is the setscrew 1276, oriented in a horizontal direction with respect to cutting insert 1214, or in a direction that is transverse to central axis A. The setscrew 1276 can reciprocate within its own channel (that extends in a radial direction with respect to the axis A), via threaded engagement between the two. To actuate translational motion of the setscrew 1276 within its own channel, the wrench tool 1270 may be employed to rotate the setscrew 1276 about its own rotational axis. To this end, the protrusion 1274 of wrench tool 1270 may be inserted in the compatible recess 1278 located at a back end of the setscrew 1276 (i.e., at an end of the setscrew disposed away from the axis A).

It should be appreciated that FIG. 12C indeed illustrates the cutting insert 1214 in a condition ready for "bump-off", or disassembly, analogously to FIG. 9C. Thus, "bump-off" here will be facilitated merely via rotating the wrench tool 1270 within its radial hole 1272, whereby the end protrusion 1274 contacts a bottom surface of centering pin 1235 and urges the same to move upwardly (i.e., toward the leading edge end the cutting tool 1210), thereby releasing the insert 1214 from the pocket centering walls 1232 (and thus, from the pocket itself). Also, to permit "bump-off", setscrew 1276 (as shown) can be translated away from central axis A, to permit cutting insert 1214 to move axially upwardly in unhindered manner.

Figure 12D:
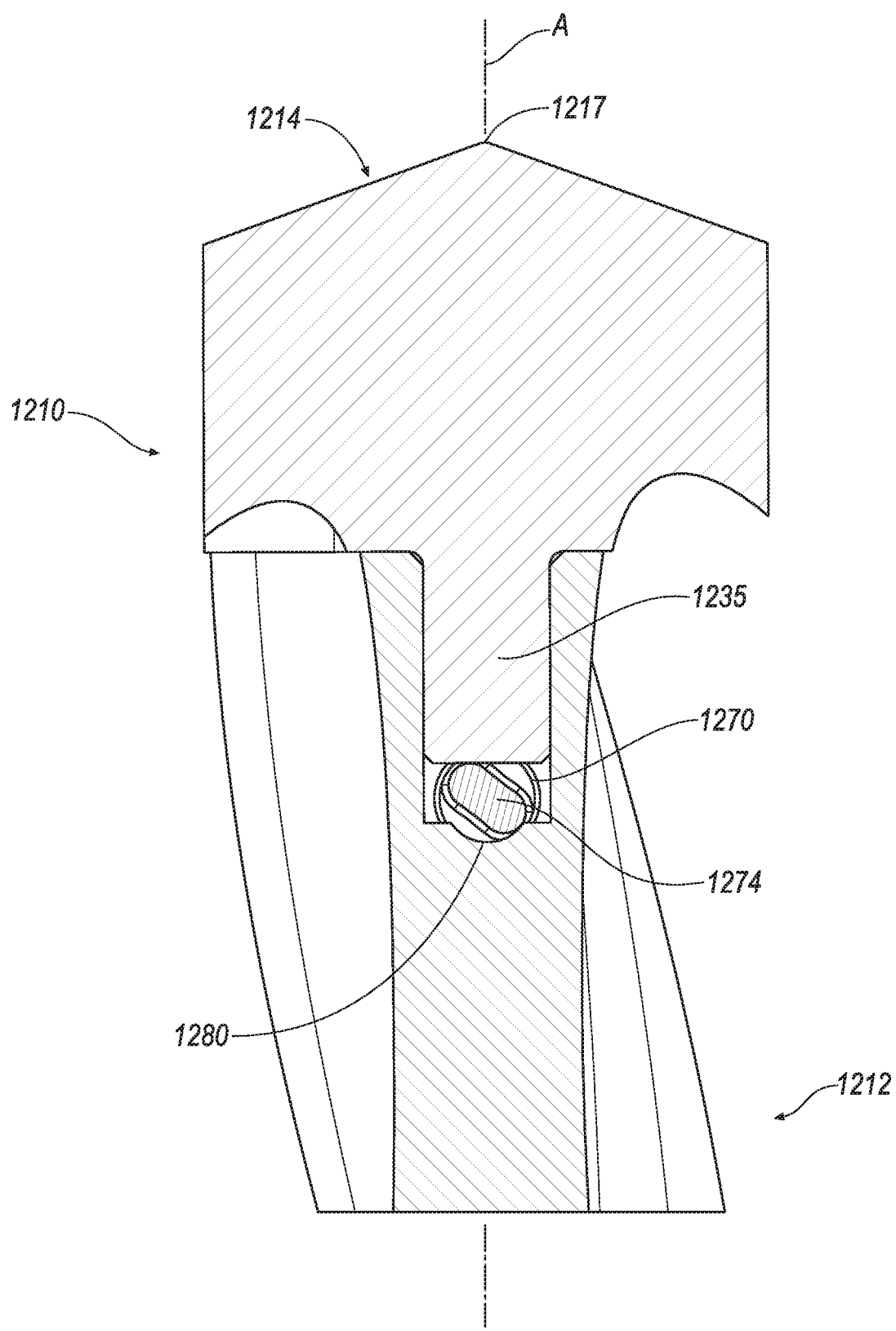
FIG. 12D provides an axial section taken through the line 12D-12D in FIG. 12A.

FIG. 12D provides an axial section taken through the line 12D-12D in FIG. 12A. As shown, the protrusion 1274 of wrench tool 1270 may be shaped as a stadium (geometric shape) in cross-section. A curved trough 1280 may thus be provided to accommodate rotational movement of protrusion 1274, wherein both components are shaped compatibly to permit such movement. The trough 1280, for its part, can be understood to be an extension of the radial hole 1272 shown in FIG. 12A and serve as a support to withstand the force created by the interaction between protrusion 1274 and the bottom portion of pin 1235.

Figure 13A:
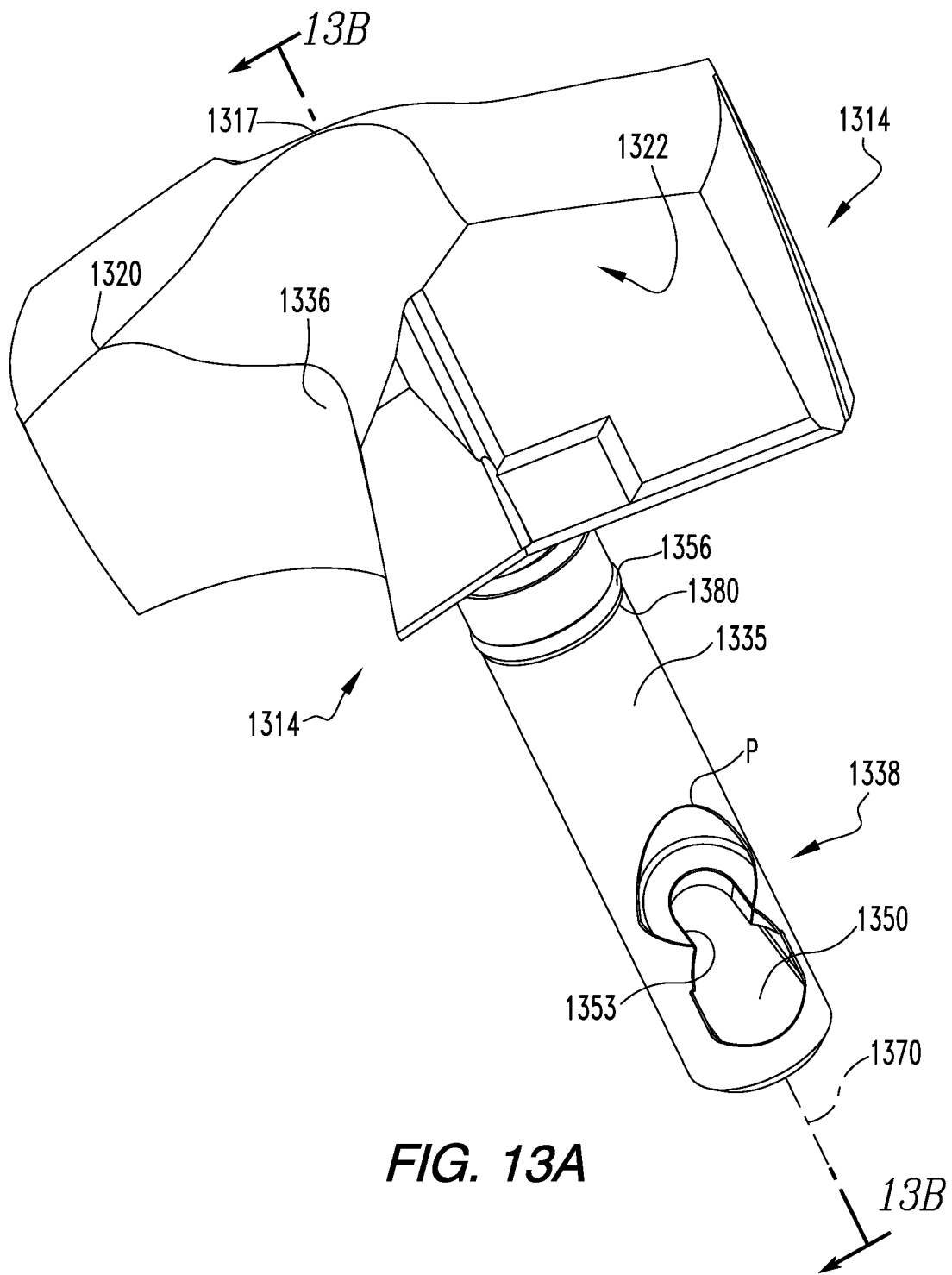
FIG. 13A provides an elevational isometric view of a cutting insert.

FIG. 13A provides an elevational isometric view of a cutting insert 1314, in accordance with at least one embodiment. Similar to the arrangements illustrated in FIGS. 7A-7D, 8, and 9A-9D, cutting insert 1314 includes a centering pin 1335 in the form of an elongated body which is coupled to, and extends axially away from, a main head portion (or head) 1336. As shown in the sectional view of FIG. 13B, centering pin 1335 may include a threaded portion 1335A disposed at or near a trailing end (not numbered) thereof which may be cooperatively engaged with a corresponding threaded aperture 1336A of head portion 1336 such that centering pin 1335 may be coupled or uncoupled from head portion 1336 via rotation of one or both of components 1335 and/or 1336 about a longitudinal axis 1370 of centering pin 1335. Such arrangement allows for cutting insert 1314 to be formed from a different material than centering pin 1335, which is more cost effective and provides for greater flexibility of materials which may be utilized for such components. For example, cutting insert 1314 is preferably formed from a hard material (e.g., without limitation, carbide) to provide the best capability for metal cutting. Meanwhile, centering pin 1335 is preferably formed from a material having a high toughness (e.g., without limitation, steel) in order to avoid distortion in areas engaged by a setscrew, such as described below. Additionally, such arrangement provides for centering pin 1335 to be used multiple times while cutting insert 1314, which is recognized as a wear part, is replaced after certain use.

Similar to the arrangements of FIGS. 7A-7D, 8, and 9A-9D, a recess 1338 is provided in centering pin 1335 generally near a leading end (not numbered) of centering pin 1335 to accommodate a setscrew (such as setscrew 1340 shown in FIG. 14 and described below), in a manner to be more fully appreciated herebelow. In the example embodiment illustrated in FIG. 13A, recess 1338 is bounded by a continuous periphery P which is disposed at the outer surface of centering pin 1335 such that recess 1335 may be considered to be at least partially enclosed by centering pin 1335. Also shown in FIG. 13A are cutting edges 1320, drive surfaces 1322 and a cutting tip 1317 of head portion 1336 which may be regarded as analogous to similar components described and illustrated elsewhere herein.

Figure 13B:
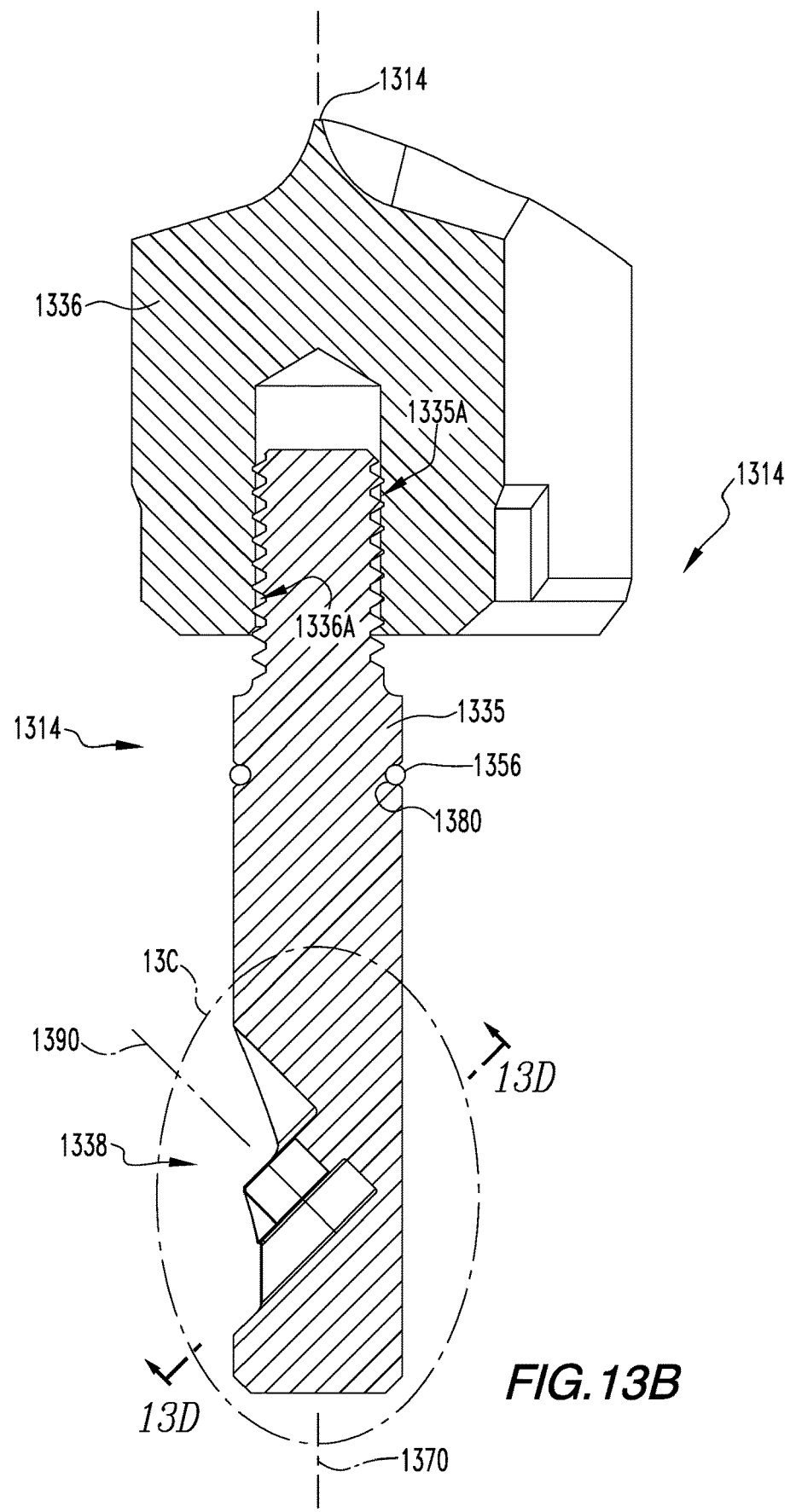
FIG. 13B provides an axial section taken through the line 13B-13B in FIG. 13A.
Figure 13C:
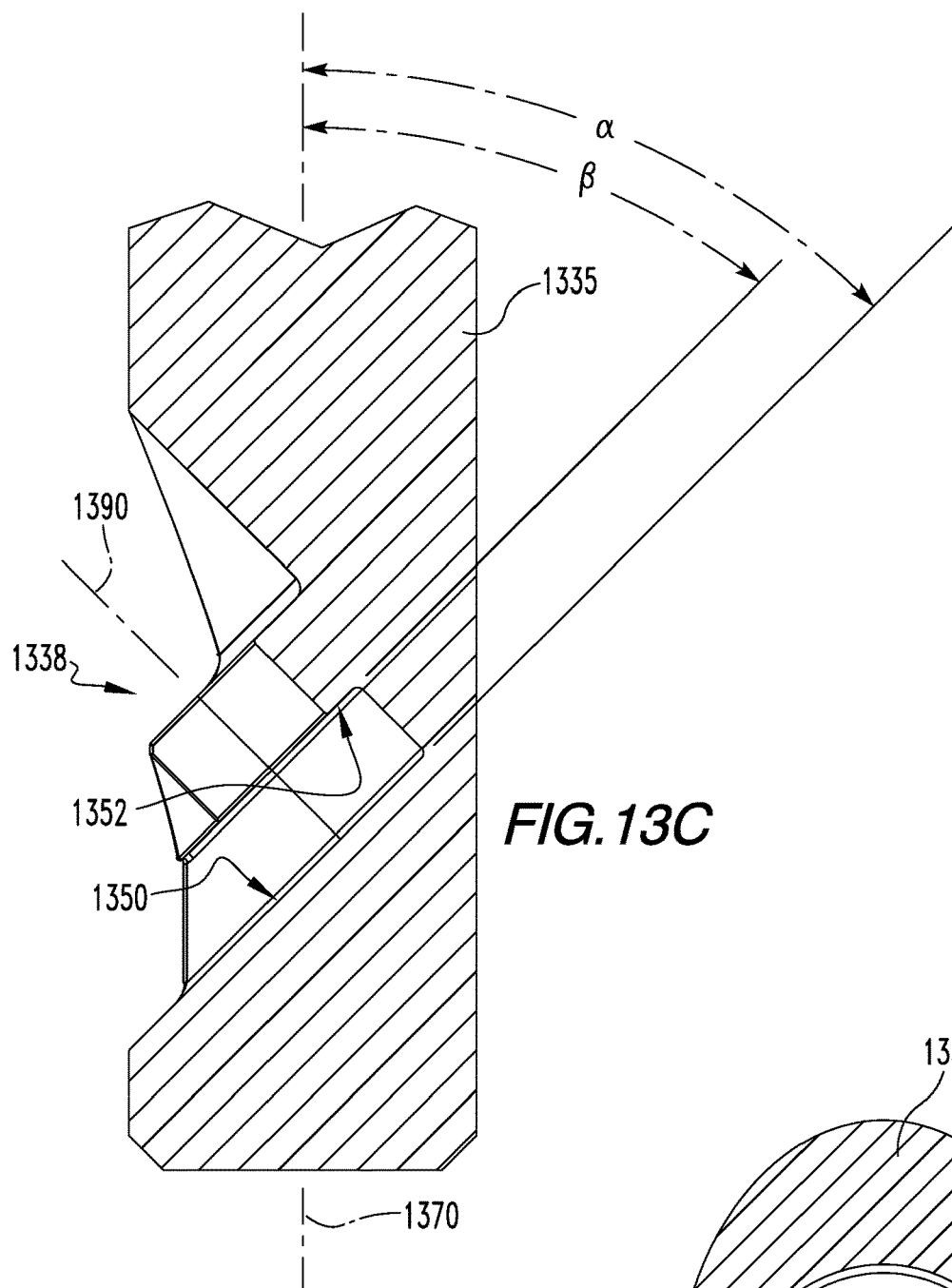
FIG. 13C provides a detail view of the portion of FIG. 13A indicated at 13C in FIG. 13A.
Figure 14:
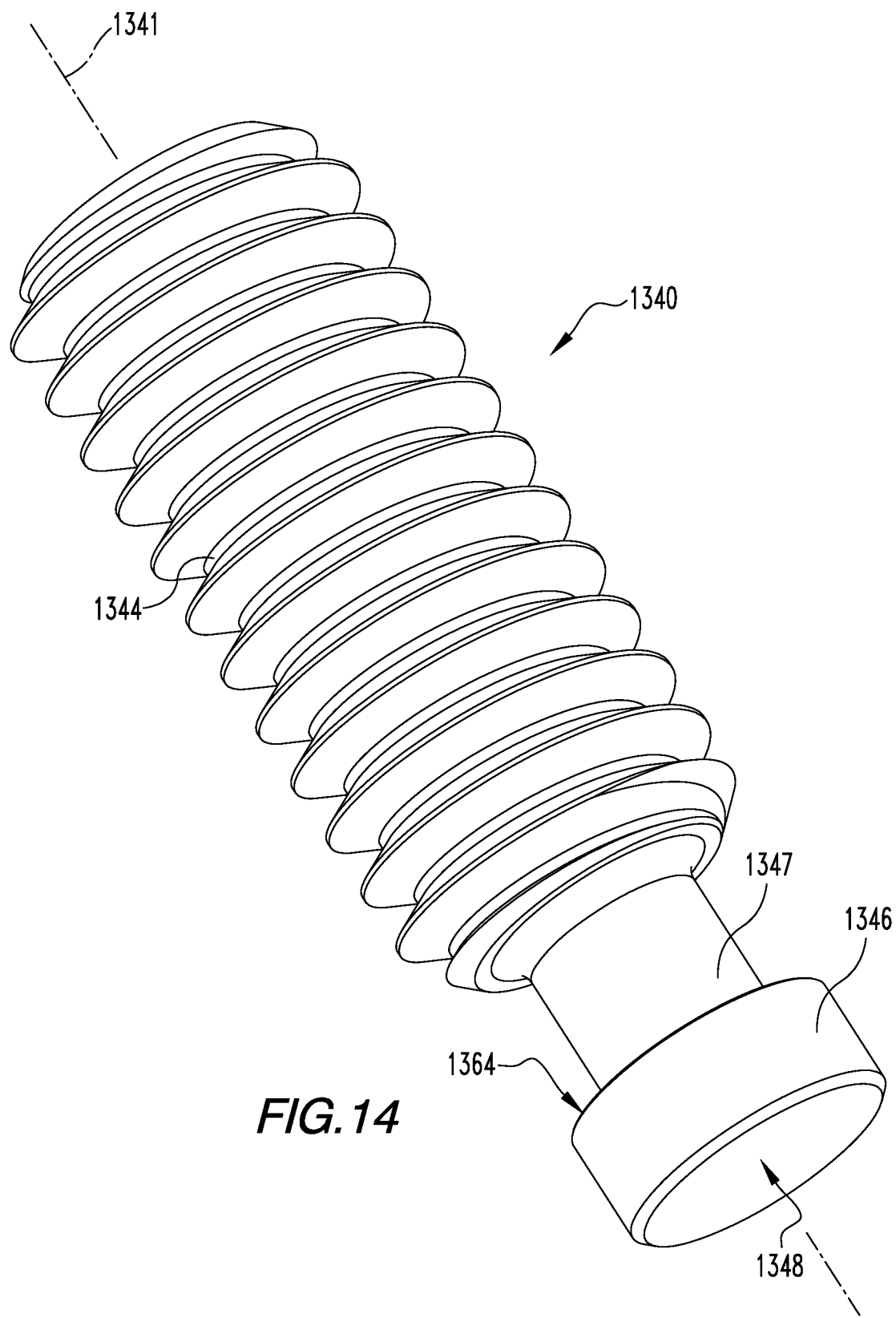
FIG. 14 provides an isometric view of a setscrew.

FIG. 13B, which provides a sectional view taken along 13B-13B in FIG. 13A (and along longitudinal axis 1370), along with FIG. 13C which shows a detailed view of the portion of FIG. 13B generally indicated at C, illustrate some elements and viable proportional dimensions of recess 1338 which interact with corresponding portions of a setscrew 1340 such as shown in FIG. 14 and described below. As shown in FIG. 13C, in accordance with at least one embodiment, recess 1338 includes a first angled surface 1350, disposed generally facing away from the leading end of centering pin 1335 (i.e., surface 1350 generally faces toward head portion 1336). First angled surface 1350 is oriented at an acute first angle α with respect to longitudinal axis 1370 of centering pin 1335. First angle α may be in the range of 30° to 85°, and in the example illustrated embodiment is about 45°.

Continuing to refer to FIG. 13C, recess 1338 further includes a second angled surface 1352 which is positioned opposing first angled surface 1350 (i.e., facing generally toward the leading end of centering pin 1335) at an acute second angle β with respect to longitudinal axis 1370 of centering pin 1335. Similar to first angle α, second angle β may be in the range of 30° to 85°, and in the example illustrated embodiment is about 45°. It is to be appreciated that as used with respect to the first angled surface 1350 and the second angled surface 1352, the term "opposing" shall mean that the two surfaces face each other and are oriented so as to form an angle therebetween which is less than 60°, preferably around 30° or less, and most preferably 0° (i.e., preferably the two surfaces are parallel).

Figure 13D:
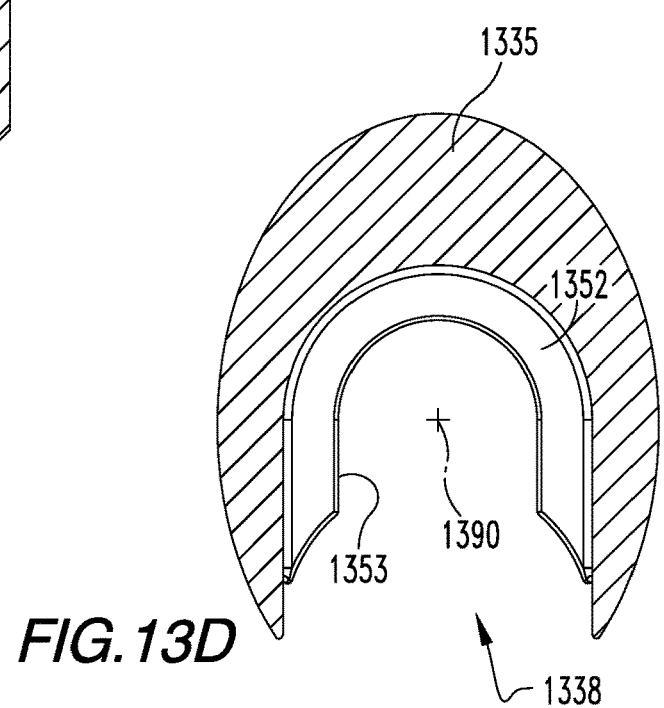
FIG. 13D provides a sectional view such as taken through the line 13D-13D in FIG. 13B.

As shown in FIG. 13D, which is a sectional view of centering pin 1335 taken through the line 13D-13D of FIG. 13B facing toward second angled surface 1352, a cutout region 1353 is provided in second angled surface 1352. In the illustrated example, cutout region 1353 is generally disposed about a recess axis 1390 which preferably is disposed at a right angle with respect to first angled surface 1350 and second angled surface 1352. As will appreciated from the further description below, a 90° angle is preferred since this gives the best surface contact between rotating surfaces on setscrew 1340 and corresponding axial sliding surfaces within cutout region 1353 of centering pin 1335. Other angles from 70 to 89° would still enable similar function but reduce transmittable forces due to change from a full face contact to line or point contacts.

Referring now to FIG. 14, setscrew 1340 for use with cutting insert 1314 includes a threaded main shaft portion 1344, disposed about a central longitudinal axis 1341, and a head portion 1346, with a narrowed neck region 1347 disposed therebetween. Head portion 1346, as shown, may be generally cylindrical. Head portion 1346 is defined in-part by a clamping surface 1348 disposed at a distal end of setscrew 1340 (i.e., an end disposed toward the insert 1314 with respect to an axial direction of the setscrew 1340). Head portion 1346 is further defined on an opposing side from clamping surface 1348 by a bump surface 1364. In the example illustrated embodiment clamping surface 1348 and bump surface 1364 are formed as flat surfaces disposed at 90° to longitudinal axis 1341 as such arrangement provides the best surface contact between such surfaces and corresponding surfaces of cutout region 1353 of centering pin 1335 as discussed further below.

Similar to setscrews 840 and 940 previously discussed in conjunction with FIGS. 8 and 9A-9C, setscrew 1340 may be threadedly engaged in a compatible channel of a shank in order to translate in parallel to its own central longitudinal axis 1341 in order to engage or disengage with recess 1334 of insert 1314 in a manner to be more fully appreciated below. To this end, it may be actuated at a rear portion thereof (i.e., at that end portion disposed away from head portion 1346), via a wrench tool or other suitable arrangement that can displace setscrew 1340 in a rotational direction (about its own central longitudinal axis 1341) to thereby translate the setscrew 1340 with respect to a shank via the aforementioned threaded engagement.

Figure 15A:
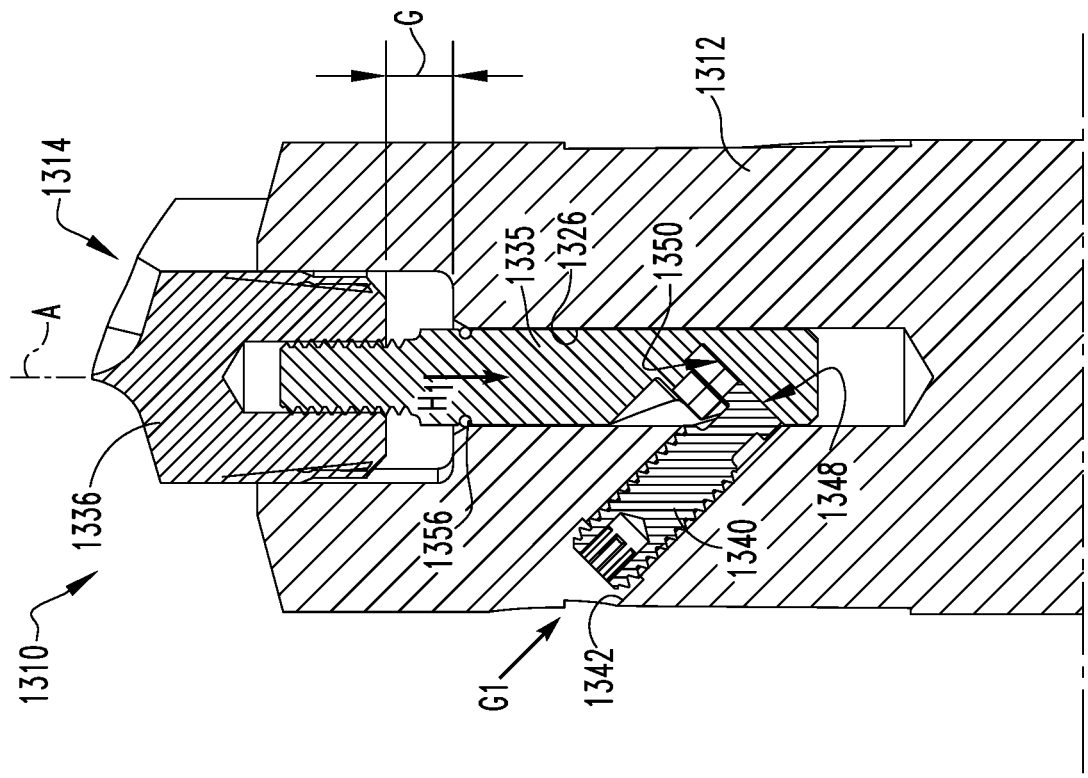
FIG. 15A schematically illustrates, in an elevational cross-sectional view, a cutting insert and a setscrew in an initial position for assembly in a shank.

FIG. 15A shows an example cutting tool 1310 in which setscrew 1340 is disposed in a dedicated channel (or hole) 1342 formed in a generally cylindrical shank 1312 in a manner such that setscrew 1340 can reciprocally translate within the channel/hole 1342. As noted above, such movement may be promoted via mutual threaded engagement between setscrew 1340 and channel/hole 1342.

Figure 15B:
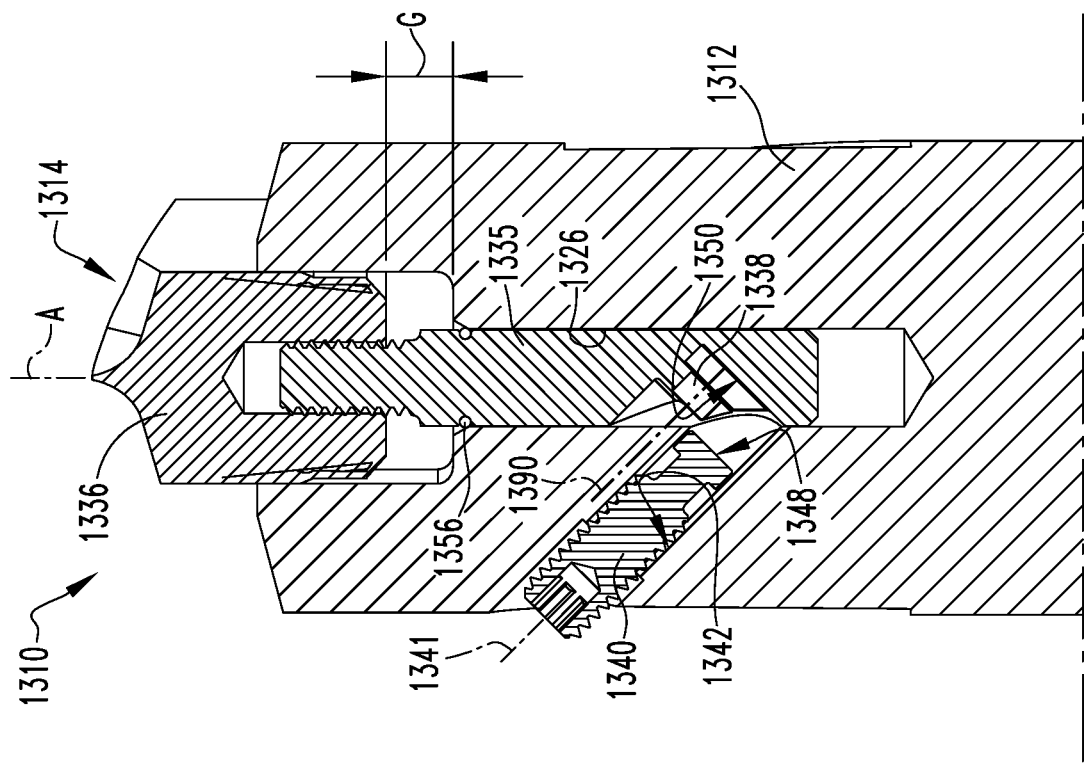
FIG. 15B schematically illustrates the cutting insert and setscrew of FIG. 15A, in an positioning in which the setscrew initially engages the cutting insert.

For clamping, setscrew 1340 can be positioned such that longitudinal axis 1341 thereof is positioned generally parallel to recess axis 1390 of recess 1338 such that clamping surface 1348 of setscrew 1340 will fully engage first angled surface 1350 of centering pin 1335, thus creating an axial clamping force that urges centering pin 1335, and thus cutting insert 1314 in a direction H1 as shown in FIG. 15B. A parallel arrangement of axis 1341 and 1390 is preferred since this gives the best surface contact between the rotating surfaces (i.e., clamping surface 1348 or bump surface 1346) on setscrew 1340 and the corresponding axial sliding surfaces (i.e., first angled surface 1350 or second angled surface 1352) of recess 1338 of centering pin 1335. It is to be appreciated, however, that other angles from 1° to 10° would still enable similar function but would reduce transmittable forces due to change from a full face contact to line or point contacts.

As shown, the shank 1312 includes a central hole 1326 for accommodating the centering pin 1335 of cutting insert 1314. Preferably, the centering pin 1335 will have a precise slide fit with respect to the central hole 1326. As such, the side component of the clamping force created by the setscrew 1340 will be supported by the wall of hole 1326, thus preventing excessive displacement of the centering pin 1335. It can be appreciated that any such excessive displacement could otherwise cause the insert 1314 to lose its concentricity with the axis of rotation A, and/or cause breakage of the pin 1335. The combination of a precise fit between centering pin 1335 and hole 1326, in conjunction with an interference fit between insert 1314 and a pocket of shank 1312 (such as pocket 428 in FIG. 4) will ensure that the insert 1314 is clamped in a correct position and remains stable in its position during operation. As such, it can be appreciated that in at accordance with at least one embodiment the hole 1326 and pin 1335 may assume a circular cross-section when viewed two-dimensionally (in a plane transverse to axis A), and a generally cylindrical configuration when viewed three-dimensionally. However, in accordance with at least one variant embodiment, the hole 1326 and pin 1335 may assume any of a wide variety of other possible two-dimensional cross-sectional shapes, e.g., an oblong (stadium) or elliptical shape.

To help ensure that the centering pin 1335 (and cutting insert 1314) initially sits at a predetermined position for proper engagement with the front portion 1346 of setscrew 1340, centering pin 1335 may include a circumferential groove 1380 extending around centering pin 1335 near head portion 1336 having a deformable element, such as an o-ring 1356, fitted partially therein. Preferably, the deformable element 1356 provides a frictional fit against the wall of hole 1326 in a manner such that centering pin 1335 may generally be initially inserted into hole 1326 of shank 1312, such as shown in the positioning of FIG. 15A, and such that centering pin 1335 may be removed from hole 1326 with a minimal force without the need for additional tooling. Additionally, the deformable element 1356 provides a seal, keeping possible contaminants from hole 1326 and the interacting surfaces of pocket 1338 and setscrew 1340.

As shown, in FIG. 15B, as setscrew 1340 is translated into hole/channel 1342, the entire clamping surface 1348 of setscrew 1340 contacts the first angled surface 1350 of shaft 1335. The manner of engagement between setscrew 1340 and shaft 1335 then changes in a manner to be appreciated more fully herebelow.

Figure 15F:
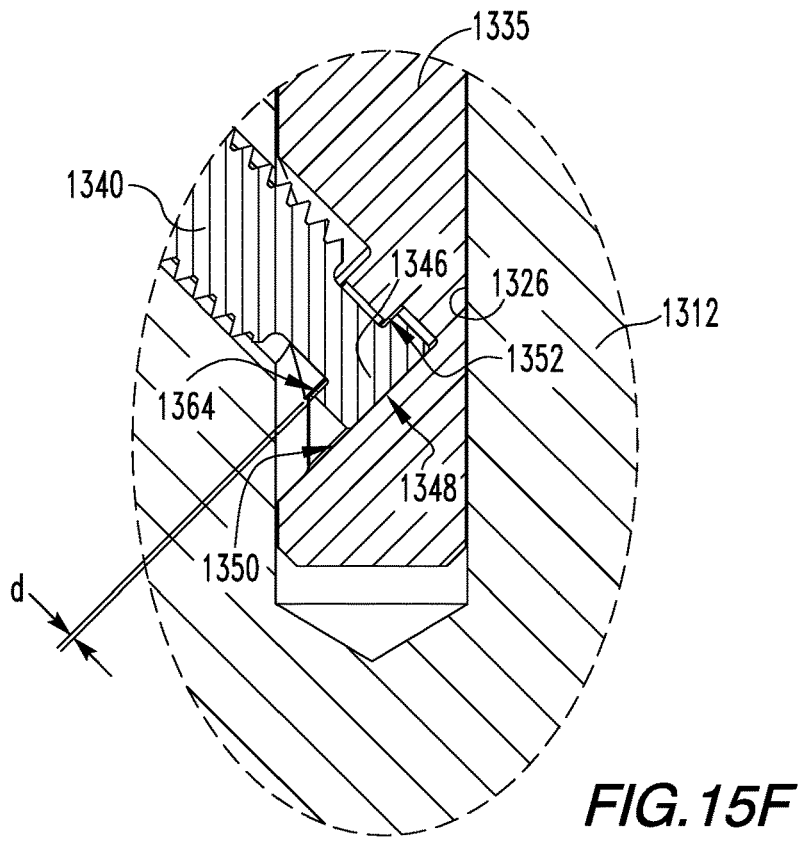
FIG. 15F provides a detail view of the portion of FIG. 15D indicated at 15F in FIG. 15D.
Figure 15G:
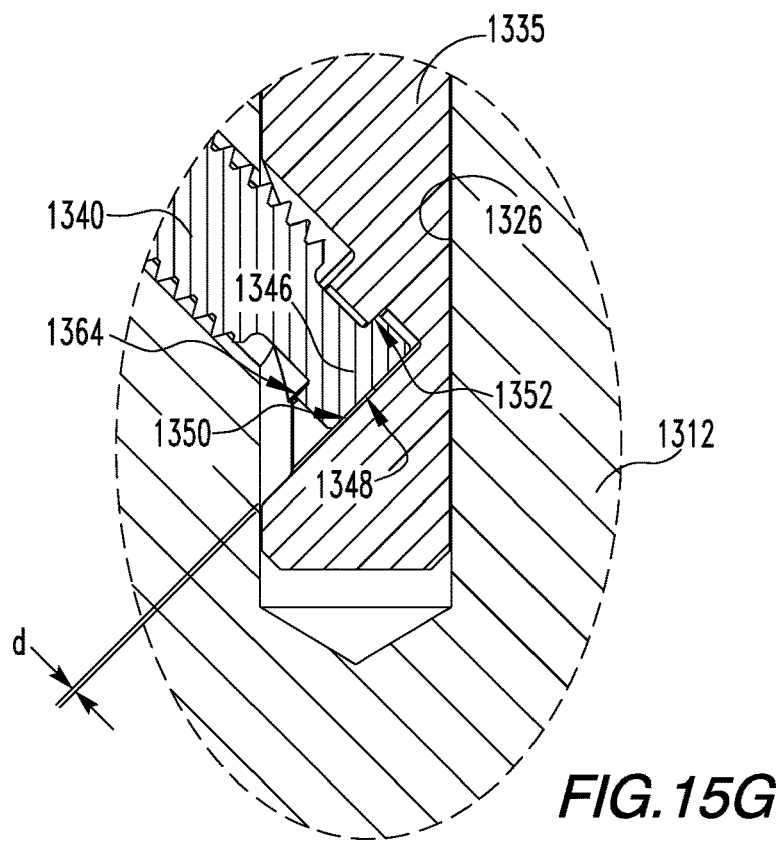
FIG. 15G provides a detail view of the portion of FIG. 15E indicated at 15G in FIG. 15E.

FIG. 15D schematically illustrates cutting insert 1314 and setscrew 1340 of FIGS. 15A and 15B, but in a "clamped" position. To achieve such a "clamped" position, the setscrew 1340 was translated within channel 1342 (e.g., via rotation and the aforementioned threaded engagement), in a direction G1, to cause the centering pin 1335 (and thus the cutting insert 1314) to move axially downwardly (i.e., in direction H1) as clamping surface 1348 of setscrew 1340 is rotated about axis 1341 and translates (via corresponding downward movement of centering pin 1335) along first angled surface 1350 of recess 1338 toward axis 1390. Such interaction between clamping surface 1348 and first angled surface 1350 causes the entire cutting insert 1314 to move axially downwardly in a pocket of the shank 1312 (e.g., such as pocket 428 in FIGS. 4 and 5), whereupon centering walls of the pocket (e.g., such as walls 432 in FIGS. 4 and 5) will deform elastically in a radially outward direction (with respect to axis A). This will then promote an interference fit of the insert 1314 within shank 1312 (as also discussed hereabove), such that the insert 1314 is then securely clamped within shank 1312. As shown in FIG. 15F (which is a detail view of a portion of FIG. 15D), when disposed in the "clamped position", bump surface 1364 of setscrew 1340 is spaced a clearance distance d from second angled surface 1352.

In accordance with at least one embodiment, FIG. 15E schematically illustrates the cutting insert 1314 and setscrew 1340 of FIGS. 15A-D, with the insert still in a "clamped" position and but with the setscrew 1340 already positioned for bump-off (i.e., setscrew 1340 has been translated within channel 1342 in the direction opposite of that previously described) such that the clearance distance d which previously existed between second angled surface 1352 and bump surface 1364 now instead exists between clamping surface 1348 and first angled surface 1350. As such, the "bump-off" action takes place when the setscrew 1340 undergoes reverse translational movement, as indicated by arrow G2, and bump surface 1364 of head portion 1346 is rotated about axis 1341 and translates (via corresponding upward movement of centering pin 1335) along second angled surface 1352 of recess 1338 away from axis 1390. Such interaction between surfaces 1352 and 1364 causes the centering pin 1335 (and cutting insert 1314) to displace axially in a "return" direction as indicated by arrow H2. The insert 1314 will be pushed out of the pocket and must overcome the frictional forces exerted by the pocket walls (due to interference fit).

Figure 15H:
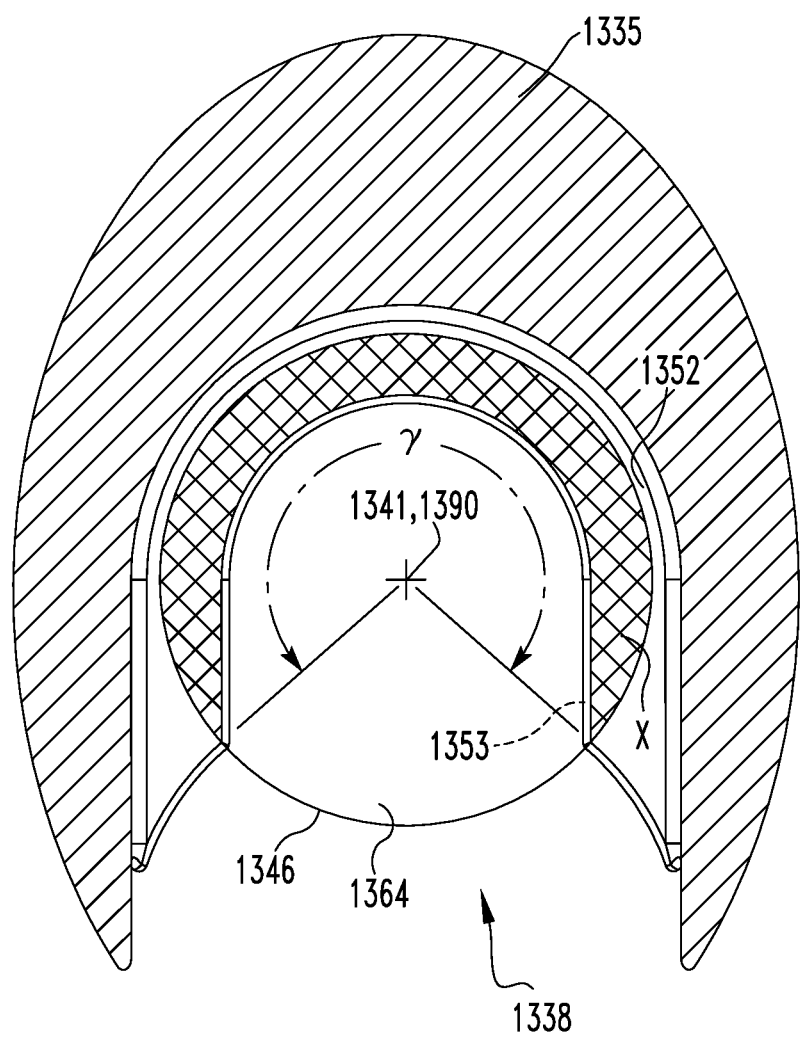
FIG. 15H provides a sectional view, similar to FIG. 13D, which shows, the interaction area between the cutting insert and setscrew of FIG. 15E such as taken through the line 15H-15H in FIG. 15E.

FIG. 15H shows a sectional view, similar to FIG. 13D, which shows, the interaction area X (shown in cross-hatching) between bump surface 1364 of head portion 1346 and second angled surface 1352. It is thus to be readily appreciated that such arrangement of neck region 1347 and bump surface 1364 of setscrew 1340 along with second angled surface 1352 and cutout region 1353 of recess 1338 of centering pin 1335 provides for an interaction area X which generally encompasses an angle γ about recess axis 1390 of recess 1338 (and longitudinal axis 1341 of setscrew 1340) of at least 160°, and preferably more than such value. Angle γ may be as much as 330°. Such interaction area provides for a large contact surface which is more robust than previous solutions and provides for improved reliability and increased component life.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A cutting insert comprising:
    a head portion having a plurality of cutting edges; and
    a centering pin having a central longitudinal axis extending away from the head portion, the centering pin comprising a notch disposed between a leading end of the centering pin and the head portion, the notch adapted to accommodate a portion of a setscrew, the notch comprising:
        a first angled surface disposed generally facing away from a leading end of the centering pin at an acute first angle with respect to the longitudinal axis of the centering pin; and a second angled surface which is positioned opposing the first angled surface at an acute second angle with respect to the longitudinal axis of the centering pin,
wherein the second angled surface includes a cutout region disposed about an axis of the notch that is structured to accommodate a sub-portion of the setscrew therein such that at least a portion of the second angled surface encompasses an angle about the sub-portion of the setscrew, and wherein the angle is at least 160°.

2. The cutting insert of claim 1, wherein the first angle and the second angle are in the range of 30° to 85°.

3. The cutting insert of claim 2, wherein the first angle is about 45°.

4. The cutting insert of claim 1, wherein the first angled surface and the second angled surface are disposed generally parallel to each other.

5. The cutting insert of claim 1, wherein the head portion comprises a plurality of drive surfaces for cooperating with a respective torque transmission wall of a shank.

6. The cutting insert of claim 1, wherein the centering pin includes a threaded portion disposed at or near a trailing end thereof which is cooperatively engaged with a corresponding threaded aperture defined in the head portion such that the centering pin may be coupled or uncoupled from the head portion via rotation of one or both of the head portion and/or the centering pin about a longitudinal axis of the centering pin.

7. The cutting insert of claim 6, wherein the head portion is formed from a carbide material and the centering pin is formed from a steel material.

8. The cutting insert of claim 1, wherein the centering pin includes a circumferential groove extending around the centering pin near the head portion which is structured to partially fit a deformable element therein.

9. A rotary cutting tool comprising:
a shank having a pocket;
an interchangeable cutting insert comprising:
   a head portion positionable in the pocket, the head portion having a number of cutting edges; and
   a centering pin which is disposed about a central longitudinal axis and which is coupled to, and extends axially away from, the head portion, the centering pin comprising a notch disposed between a leading end of the centering pin and the head portion, the notch comprising:
      a first angled surface disposed generally facing away from a leading end of the centering pin at an acute first angle with respect to the longitudinal axis of the centering pin; and
      a second angled surface which is positioned opposing the first angled surface at an acute second angle with respect to the longitudinal axis of the centering pin; and
a setscrew having:
   a threaded main shaft portion disposed about a central longitudinal axis, the threaded main shaft portion threadingly engaged with a correspondingly threaded channel formed in the shank in a manner such that the setscrew can reciprocally translate within the channel;
   a narrowed neck region disposed adjacent the main shaft portion; and
   a head portion disposed adjacent the narrowed neck region opposite the main shaft portion, the head portion defined in-part by a clamping surface disposed at a distal end of the setscrew opposite the neck region and a bump surface disposed adjacent the neck region opposite the clamping surface;
wherein the setscrew and the cutting insert are movable among:
   an initial position, wherein the cutting insert is initially received in the pocket and the setscrew is not directly engaged with the centering pin;
   a clamped position, wherein the cutting insert is fixedly held with respect to the shank via engagement between the clamping surface of the setscrew and the first angled surface of the notch of the centering pin; and
   a bump-off position, wherein the cutting insert is forced outward from the shank via engagement between the bump surface of the setscrew and the second angled surface of the notch of the centering pin.

10. The rotary cutting tool of claim 9, wherein the second angled surface of the notch of the centering pin includes a cutout region disposed about an axis of the notch,
wherein, when disposed in the bump-off position the neck region of the setscrew is disposed in the cutout region, and
wherein, when disposed in the bump-off position, the bump surface of the setscrew and the second angled surface of the notch of the centering pin are engaged in an interaction area which encompasses an angle about the longitudinal axis of the setscrew of at least 160°.

* * * * *